(12) United States Patent  
Eisner et al.

(10) Patent No.: US 12,429,617 B1  
(45) Date of Patent: Sep. 30, 2025

(54) METHODS AND SYSTEMS FOR SEISMIC MONITORING

(71) Applicant: King Fahd University of Petroleum and Minerals, Dhahran (SA)

(72) Inventors: Leo Eisner, Prague (CZ); Oleh Kalinichenko, Prague (CZ); Frantisek Stanek, Plzen (CZ); Umair Bin Waheed, Dhahran (SA); Sherif Mohamed Hanafy Mahmoud, Dhahran (SA); Zuzana Jechumtálová, Prague (CZ)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/208,456

(22) Filed: May 14, 2025

Related U.S. Application Data

(60) Provisional application No. 63/680,498, filed on Aug. 7, 2024.

(51) Int. Cl.  
  *G01V 1/52* (2006.01)  
  *G01V 1/46* (2006.01)  
  *G01V 1/50* (2006.01)

(52) U.S. Cl.  
  CPC ............. *G01V 1/46* (2013.01); *G01V 1/50* (2013.01); *G01V 1/52* (2013.01); *G01V 2001/526* (2013.01); *G01V 2210/1429* (2013.01)

(58) Field of Classification Search  
  CPC ..... G01V 1/46; G01V 1/50; G01V 1/52; G01V 2001/526; G01V 2210/1429  
  See application file for complete search history.

(56) References Cited

U.S. PATENT DOCUMENTS

| 9,897,710 | B2* | 2/2018 | Kragh ................. G01V 1/40 |
| 2009/0073805 | A1 | 3/2009 | Tulett et al. |
| 2015/0346365 | A1 | 12/2015 | Desrues |
| 2016/0341839 | A1* | 11/2016 | Kazinnik ............. G01V 1/28 |
| 2016/0377751 | A1 | 12/2016 | De Meersman et al. |

FOREIGN PATENT DOCUMENTS

EP  2 972 502 B1  7/2019

* cited by examiner

*Primary Examiner* — Krystine E Breier  
(74) *Attorney, Agent, or Firm* — Oblon, McClelland, Maier &Neustadt, L.L.P.

(57) ABSTRACT

A system for determining a depth z to install a borehole receiver in a monitoring borehole includes a seismic source, a seismic receiver, an antenna, a computing device and a drilling system. The seismic source generates surface waves having multiple frequencies in a frequency band of interest within a geologic formation such as a subterranean reservoir. The seismic receiver is placed at a distance d from the seismic source, to receive the surface waves. The computing device determines a smallest frequency f1 of the multiple frequencies. The computing device further determines a surface wave velocity v for the smallest frequency f1. The computing device further calculates a longest wavelength WL of the surface wave in the frequency band of interest based on WL=v/f1. The borehole receiver is installed, e.g., with the drilling system, in the monitoring borehole at the depth z equal to the longest wavelength WL.

20 Claims, 11 Drawing Sheets

METHODS AND SYSTEMS FOR SEISMIC MONITORING

CROSS REFERENCE TO RELATED APPLICATIONS

The present application claims the benefit of priority to U.S. Prov. App. No. 63/680,498, entitled "Method of Seismic Monitoring", filed on Aug. 7, 2024, and incorporated herein by reference in its entirety.

STATEMENT OF ACKNOWLEDGEMENT

Support provided by the King Fahd University of Petroleum and Minerals (KFUPM), Riyadh, Saudi Arabia through Project No. CPG-21-0157 is gratefully acknowledged.

BACKGROUND

Technical Field

The present disclosure is directed to seismic monitoring and, more particularly, to systems and methods for determining a depth z for installing borehole receivers in a monitoring borehole for the seismic monitoring.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Seismic monitoring is fundamental to geophysical exploration and subsurface analysis. Seismic monitoring is widely employed in industries such as oil and gas, mining, civil engineering, and environmental monitoring. One of the objectives of seismic monitoring is to analyze the behavior of seismic waves as they travel through various geological layers, offering critical insights into subsurface conditions and material properties.

Seismic waves generated by a seismic source propagate through the Earth's subsurface and are detected at the surface and at different depths using borehole receivers. The collected signals are processed and analyzed to create detailed models of subsurface geology and fluid reservoirs. Seismic waves are categorized into two main types: body waves (which travel through the Earth's interior) and surface waves (which travel along the Earth's surface and are used primarily for shallow investigations).

Surface waves are utilized for analyzing near surface geological structures. They possess longer wavelengths and slower velocities compared to body waves, making them highly sensitive to surface and shallow subsurface conditions. As such, surface waves provide essential information for applications such as reservoir monitoring, mining, and infrastructure stability assessments.

Effective detection and analysis of seismic waves, especially for weak seismic events like microseismicity, require careful placement of borehole receivers. Seismic monitoring networks are designed to detect and analyze waves originating from both natural and induced seismic activities. The placement of these borehole receivers depends on factors such as the type of seismic activity, the geological environment, and background seismic noise levels.

For weak seismic events, background seismic noise often exceeds sensor noise levels, posing a significant challenge. To mitigate the background seismic noise, borehole receivers are deployed in shallow or deep boreholes, where noise levels are lower compared to surface installations. However, long-term deployment in deep boreholes presents logistical challenges, including high drilling costs, instrument coupling difficulties, temperature limitations, and potential corrosion of electronic components. Therefore, deploying borehole receivers requires balancing noise reduction benefits with the economic and technical constraints of drilling and maintenance.

An aspect of seismic monitoring is to determine the optimal depth for borehole receiver placement. Traditionally, this depth is selected based on empirical data or simplified models, which may not ensure optimal conditions for capturing seismic waves effectively.

A framework has been described for drilling that considers drilling costs, measured noise levels, and a cost ratio of the surface and the borehole receivers to decide how many seismic receivers can be replaced by borehole receivers (See: Witten, B., Habiger, R. M., & Artman, B. (2013), "*A technical and economic value analysis of shallow borehole arrays for microseismic monitoring*", SEG Technical Program Expanded Abstracts 2013, 2109-2113). However, this framework fails to provide a detailed solution for dynamically determining the optimal depth of the borehole receivers based on the measured noise levels and a signal-to-noise ratio (SNR).

Another conventional approach considers signal and noise attenuation with depth (See: Grechka, V., & Heigl, W. M. (2017), "Microseismic monitoring", Society of Exploration Geophysicists, incorporated herein by reference in its entirety). However, this approach lacks specific recommendations for optimal placement of the borehole receivers.

US20090073805A1 describes a method for borehole seismic surveying in water using a first underwater source at a shallow location and a second underwater source at a deeper location. High and low frequency content of received signals is analyzed to predict underwater formations. The reference focuses on the end result of predicting the underwater formations rather than the depth for installing the borehole receivers.

Each of the aforementioned references suffers from several limitations that hinder their broader adoption in seismic monitoring methods. These references fail to accurately predict the placement depth for the borehole receivers, which is crucial for improving the SNR in microseismic data collection. For example, some conventional methods utilize shallow or deep borehole arrays without considering precise wavelengths and frequencies of the seismic waves, which directly impact the SNR. This results in less optimized placement of the borehole receivers and a suboptimal surface noise reduction. Furthermore, these methods typically use a simplified approach for depth calculation, such as relying on predetermined depth ranges or basic attenuation models, resulting in less effective monitoring of the seismic activities.

Accordingly, it is one object of the present disclosure to provide a method and a system for determining the depth for installing the borehole receivers by analyzing seismic noise attenuation and signal-to-noise ratio patterns, ensuring enhanced detection accuracy of the seismic activities.

SUMMARY

In an exemplary embodiment, a method for installing a borehole receiver in a monitoring borehole is described. The method includes generating, with a seismic source, a set of surface waves having a plurality of frequencies in a frequency band of interest. The method further includes receiving, by at least one seismic receiver placed at a distance d from the seismic source, the set of surface waves. The method further includes determining, with a computing device operatively connected to each seismic receiver, a smallest frequency f1 of the plurality of frequencies. The computing device includes an electrical circuitry, a memory storing program instructions and at least one processor configured to execute the program instructions. The method further includes determining, by the computing device, a surface wave velocity v for the smallest frequency f1. The method further includes calculating, by the computing device, a longest wavelength WL of the surface wave in the frequency band of interest based on $$WL = \frac{v}{f1}.$$

The method further includes installing, by a drilling system, at least one borehole receiver in the monitoring borehole at a depth z equal to the longest wavelength WL.

In another exemplary embodiment, a system for determining a depth z at which to install a borehole receiver in a monitoring borehole is described. The system includes at least one seismic source configured to generate, within a geologic reservoir, a set of surface waves having a plurality of frequencies in a frequency band of interest. The system further includes at least one seismic receiver placed at a distance d from the seismic source. The at least one seismic receiver is configured to receive the set of surface waves. The system further includes an antenna. The system further includes a computing device operatively connected by the antenna to each seismic receiver. The computing device includes an electrical circuitry, a memory storing program instructions and at least one processor configured to execute the program instructions to determine a smallest frequency f1 of the plurality of frequencies. The at least one processor is further configured to execute the program instructions to determine a surface wave velocity v for the smallest frequency f1. The at least one processor is further configured to execute the program instructions to calculate a longest wavelength WL of the surface wave in the frequency band of interest based on $$WL = \frac{v}{f1}.$$

The system further includes a drilling system configured to install at least one borehole receiver in the monitoring borehole at the depth z equal to the longest wavelength WL.

In another exemplary embodiment, a method of monitoring microseismic events in a geologic reservoir undergoing multi-stage fracturing is described. The method includes installing a near surface array including at least one seismic receiver at a surface of the geologic reservoir. The method further includes installing a seismic source at a distance d from the at least one seismic receiver. The method also includes generating, with the seismic source, a set of surface waves having a plurality of frequencies in a frequency band of interest. The frequency band of interest is in a range of about 10 Hz to about 30 Hz. The method further includes operatively connecting a computing device to receive measurements from each seismic receiver. The computing device includes an electrical circuitry, a memory storing program instructions and at least one processor configured to execute the program instructions for determining a surface wave velocity v for a smallest frequency f1 received by the at least one seismic receiver. The at least one processor is further configured to execute the program instructions for calculating a longest wavelength WL of the surface wave in the frequency band of interest based on $$WL = \frac{v}{f1}.$$

The method further includes installing, by a drilling system, at least one borehole receiver in a monitoring borehole at a depth z equal to the longest wavelength WL in the monitoring borehole. The method further includes receiving, by the computing device, from the at least one borehole receiver, seismic signals. The method further includes identifying, by the computing device, the microseismic events caused by the multi-stage fracturing.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
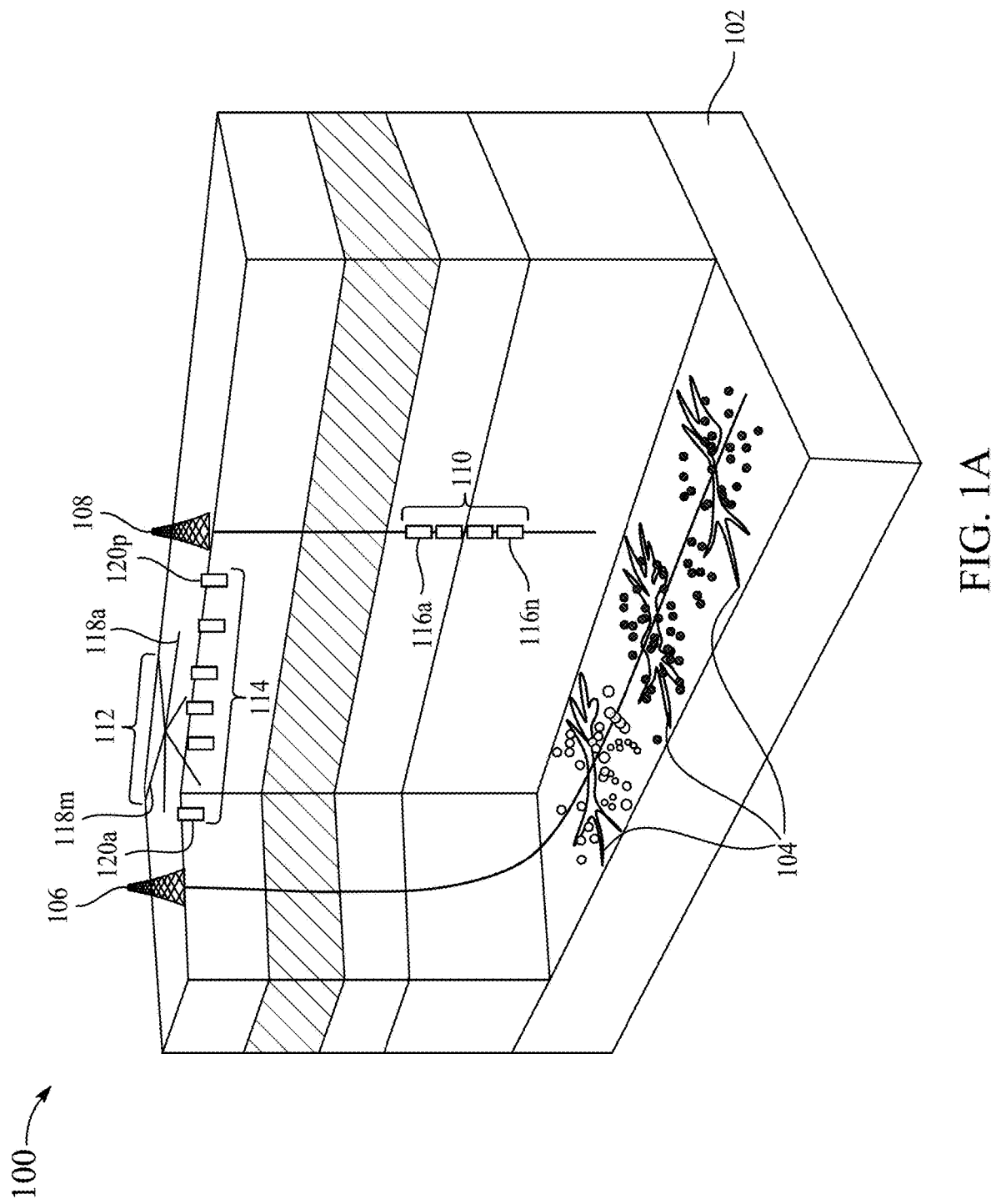
FIG. 1A illustrates an exemplary schematic representation of a hydraulic fracturing site having a downhole array at a depth to be determined, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of the disclosure are directed to a system and a method for determining a depth for the installation of borehole receivers in a geological formation based on surface wave characteristics. The method includes generating surface waves with varying frequencies using a seismic source, receiving the surface waves and reflected waves by the surface and borehole receivers and analyzing the surface waves to determine a longest wavelength WL in a frequency band of interest. Further, the method includes determining the depth for the borehole receivers using the determined longest wavelength WL, ensuring an improved signal-to-noise ratio SNR (z) by minimizing background noise and mitigating signal attenuation. The method is designed to address challenges such as surface noise and signal decay with the depth, enabling enhanced seismic data collection for applications like microseismic event detection, reservoir characterization, and hydraulic fracture monitoring. Additionally, the method incorporates economic feasibility and geological considerations, balancing the benefits of noise reduction against a cost of drilling and reducing reliance on costly deep boreholes while maintaining monitoring efficiency.

FIG. 1A illustrates an exemplary schematic representation of a hydraulic fracturing site 100 having a downhole array 110 at a depth to be determined. As used herein, the term "hydraulic fracturing site 100" refers to a location where a hydraulic fracturing process is carried out. The hydraulic fracturing is a technique that is used in oil and gas extraction to enhance a flow of hydrocarbons from a geologic reservoir 102 (hereinafter referred to as the reservoir 102).

The hydraulic fracturing site 100 includes the reservoir 102, multi-stage fractures 104, a treatment well 106, a monitoring borehole 108, the downhole array 110, a surface array 112, and a near surface array 114.

The reservoir 102 is a subsurface geological formation located beneath the surface of the earth at a particular depth and holds the hydrocarbons being targeted for extraction using the hydraulic fracturing. The hydrocarbons may be, but not limited to, oil, natural gas, coal, liquified petroleum gas (LPG), and the like. Aspects of the present disclosure are intended to include or otherwise cover any hydrocarbons, including known related art and/or later developed technologies. The hydraulic fracturing is applied to the reservoir 102 for performing the multi-stage fracturing 104 in the reservoir 102, which increases a permeability of the reservoir and enables the hydrocarbons to flow toward production wells (not shown) for extraction.

Further, the multi-stage fractures 104 may be a result of hydraulic fracturing used to enhance the extraction of the hydrocarbons from the reservoir 102 by creating multiple fractures in the reservoir 102. The multi-stage fractures 104 enable an effective treatment of different zones within the reservoir 102, even if the properties of the reservoir 102 vary along a length of the reservoir 102. For example, the reservoir 102 is divided into several stages. In an example, each stage includes a specific length of the reservoir 102. In each stage, a fracturing fluid is injected, which causes fractures within the reservoir 102. As the fractures begin to form and propagate, a plurality of microseismic events are generated. As used herein, the term "microseismic events" refers to small events generated by the fracturing of the reservoir 102. In an aspect, the microseismic events may act as a signature of a fracturing process. In other words, the microseismic events provide information about the formation, growth and behavior of the fractures that are created during the hydraulic fracturing.

The microseismic events are too small to be felt by a user. However, the microseismic events may be detectable by using various types of seismic monitoring units. As used herein, the term "seismic monitoring unit" refers to an equipment that records the microseismic events as the fractures are formed within the reservoir 102. The seismic monitoring units may be, but not limited to, the downhole array 110, the surface array 112, the near surface array 114, and the like.

The treatment well 106 is a primary well that is used as a central element in the hydraulic fracturing process, as the treatment well 106 facilitates a formation of the fractures in the reservoir 102. In an aspect, the treatment well 106 is used to inject the fracturing fluid into the reservoir 102 for forming the fractures. The treatment well 106 is designed to allow a sequential fracturing of different zones in the reservoir 102. In an aspect, the plurality of microseismic events that may be recorded during the fracturing may originate near the treatment well 106. The monitoring borehole 108 is a secondary well drilled near the treatment well 106, to monitor the hydraulic fracturing process. The monitoring borehole 108 is equipped with a plurality of seismic sensors that detect the microseismic events.

Further, the downhole array 110 includes a series of borehole receivers 116*a*-116*n* (i.e., seismic receivers) (hereinafter collectively referred to as the borehole receivers 116 and individually referred to as the borehole receiver 116) to be installed within the monitoring borehole 108 at the depth to be determined. The borehole receivers 116 are configured to capture seismic activities generated during the hydraulic fracturing process. The borehole receivers 116 may be, but not limited to, geophones, accelerometers, and the like. For example, the geophones are configured to measure a ground motion caused by seismic waves, and the accelerometers are configured to measure changes in acceleration due to the seismic waves. In an aspect, the borehole receivers 116 in the downhole array 110 may be connected by a cable, which transmits data associated with seismic signals to surface recording systems for real-time monitoring. For example, the borehole receivers 116 may be installed at a depth determined to detect the seismic signals and transmit the data associated with the seismic signals to the surface recording systems through the cable. At the surface, the surface recording systems may receive the transmitted data associated with the seismic signals from the borehole receivers 116. The surface recording systems may process, store and display the data associated with the seismic signals for the real-time monitoring and analysis. However, drilling the deep boreholes is expensive and connecting the downhole array 110 to the surface recording systems adds to cost. Moreover, the seismic signals may become attenuated as the seismic signals travel upward to receivers (i.e., shallow receivers).

The surface array 112 includes a series of surface seismic sensors 118a-118m (hereinafter collectively referred to as the surface seismic sensors 118 and individually referred to as the surface seismic sensor 118) placed directly on the surface of the earth. The surface seismic sensors 118 may be placed to capture the seismic signals associated with anthropogenic (human) activity, enabling distinction between the natural and fracture-induced microseismic events. The surface seismic sensors 118 may be, but are not limited to, the geophones, the accelerometers, and the like. The surface array 112 is cost-effective and easy to deploy as the surface array 112 does not require drilling and covers a wide area, providing an overview of seismic activity. However, the surface array 112 is highly susceptible to surface noise that is caused due to environmental factors (e.g., traffic, wind, and the like).

The near surface array 114 is placed below the surface of the earth, especially at shallow depths. The near surface array 114 includes a series of seismic receivers 120a-120p (hereinafter collectively referred to as the seismic receivers 120 and individually referred to as the seismic receiver 120) to detect the seismic signals. The near surface array 114 improves the quality of the seismic signals by minimizing the surface noise compared to the surface array 112.

Figure 1B:
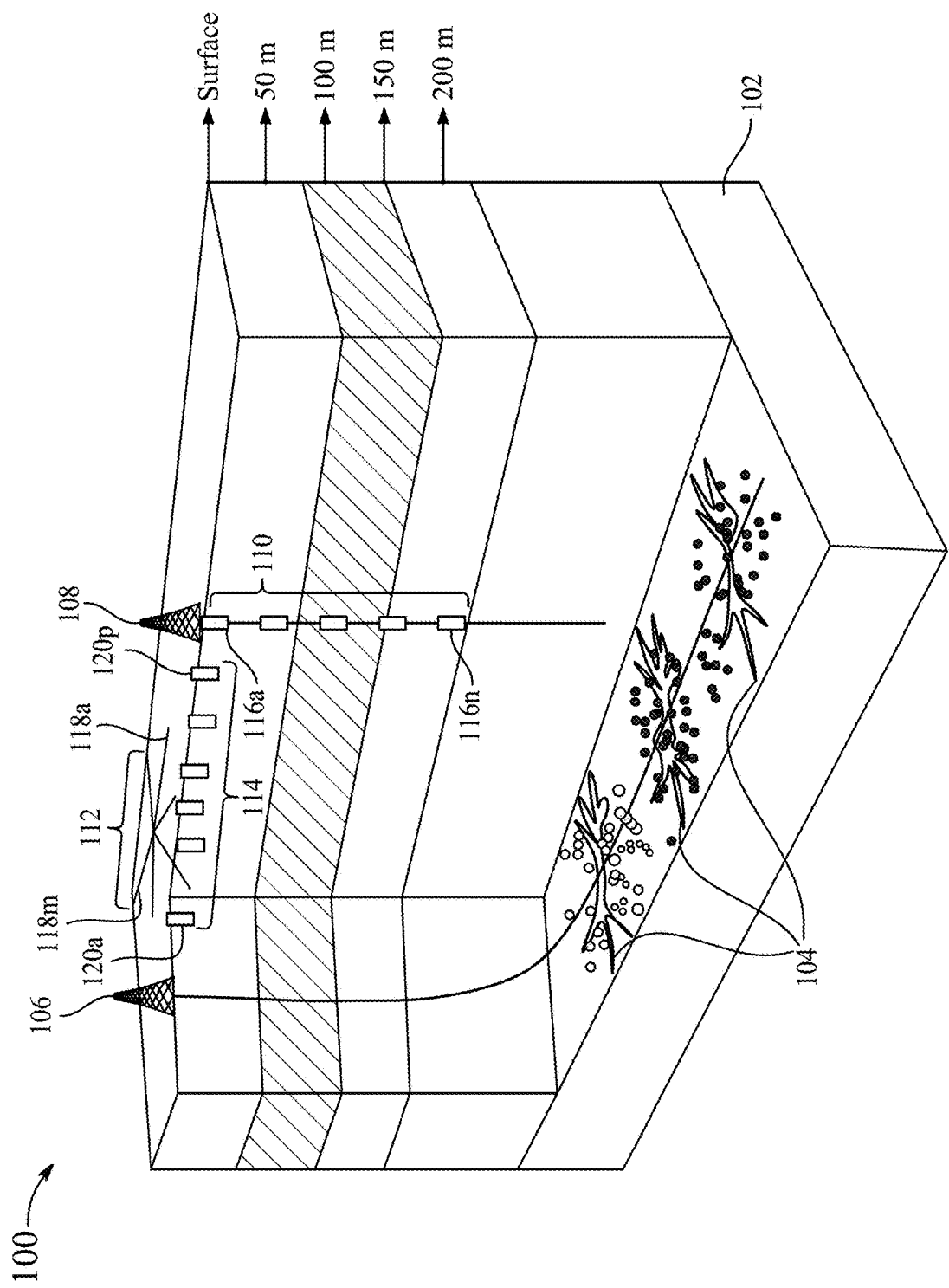
FIG. 1B illustrates another exemplary schematic representation of the hydraulic fracturing site having the downhole array installed at a known depth, according to certain embodiments.

FIG. 1B illustrates another exemplary schematic representation of the hydraulic fracturing site 100 having the downhole array 110 at a known depth. The known depth of the borehole receivers 116 in the monitoring borehole 108 is determined by using a system 122 described in FIG. 1C.

In an aspect, using seismic data, the borehole receivers 116 may be installed at different depths starting from the surface to 200 meters (m) at a predefined separation distance. In a preferred aspect, the predefined distance may be 50 m. As used herein, the term "seismic data" refers to information about the reservoir 102 (subsurface) of the earth using the seismic waves. The seismic waves may be, but not limited to, primary (P)-waves, secondary(S)-waves and surface waves.

For example, as shown in FIG. 1B, the borehole receivers 116 may be installed at the surface at 50 meter (m), 100 m, 150 m, 200 m and 250 m, where 250 m corresponds to fracturing levels within the reservoir 102. The borehole receivers 116 may be placed within the monitoring borehole 108 at each depth to detect and monitor the microseismic events generated during the hydraulic fracturing. Each borehole receiver 116 in the downhole array 110 may be positioned at the known depth to provide detailed data on the seismic activity and the fracturing propagation, enabling an accurate assessment of the fracturing process in the reservoir 102.

Figure 1C:
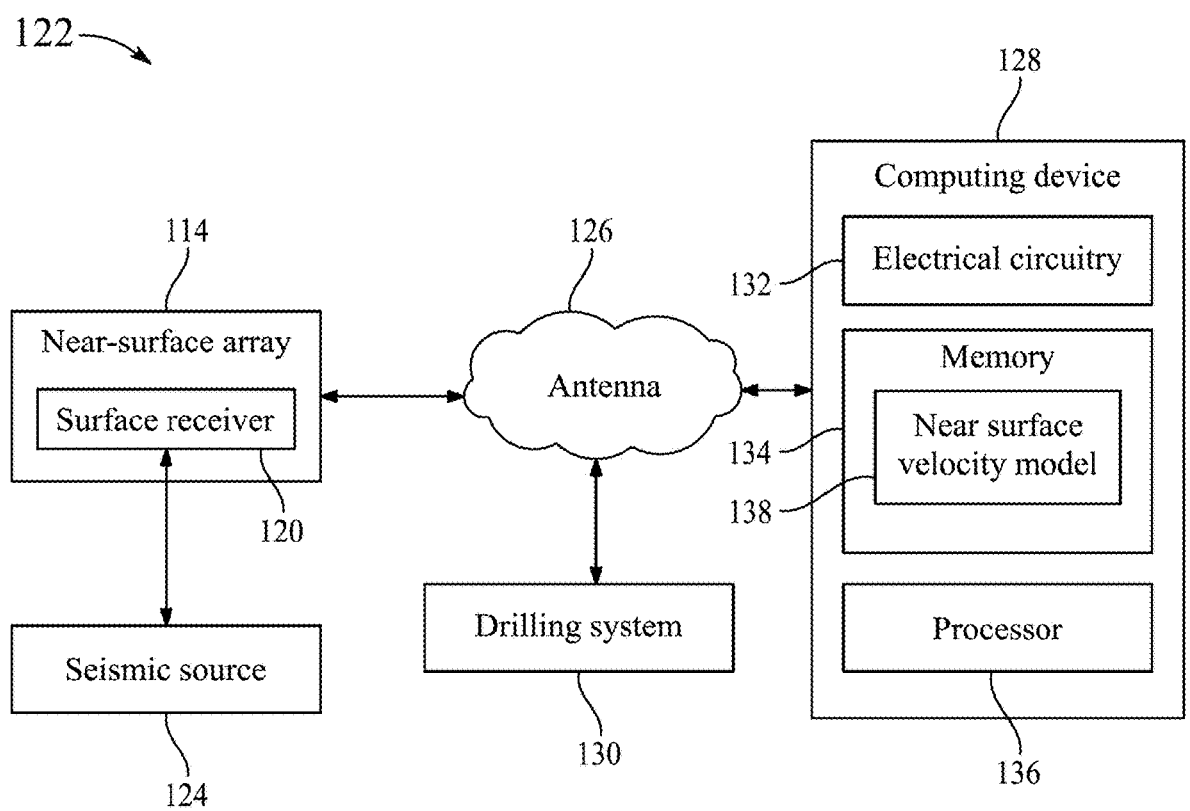
FIG. 1C illustrates a block diagram of a system for determining a depth for installing a borehole receiver in a monitoring borehole, according to certain embodiments.

FIG. 1C illustrates a block diagram of the system 122 for determining a depth z for installing a borehole receiver 116 (as shown in FIG. 1B) in the monitoring borehole 108 (as shown in FIG. 1A), according to certain embodiments. The monitoring borehole 108 (as discussed above in FIG. 1A) is a drilled borehole or a pre-existing borehole in the ground that is configured to house the borehole receivers 116 at various depths below the surface to detect the seismic activities. The seismic activities may be natural seismic activities or artificial seismic activities. The natural seismic activities may include, but are not limited to, earthquakes, volcanic eruptions, landslides, glacial movements, and the like. The artificial seismic activities may be but are not limited to, mining explosions, nuclear tests, reservoir-induced seismicity, and the like. Aspects of the present disclosure are intended to include or otherwise cover any type of the seismic activities, including known related art and/or later developed seismic activities.

Referring to FIG. 1C, the system 122 includes at least one seismic source 124 (hereinafter referred to as the seismic source 124), the near surface array 114, an antenna 126, a computing device 128, and a drilling system 130.

In an aspect, the seismic source 124 is placed at the surface of the reservoir 102 (as shown in FIG. 1A). In another aspect, the seismic source 124 is placed near the surface of the reservoir 102. As used herein, the term "the surface of the reservoir 102" refers to a position on the surface of the earth at a location directly above the reservoir 102. The seismic source 124 may be, for example, earthquakes, landslides, volcanic activities, controlled explosions, vibratory sources, electric sources, air guns, shotguns, weight drops, vibroseis, and the like. Aspects of the present disclosure are intended to include or otherwise cover any type of the seismic source 124, including known related art and/or later developed technologies. In an aspect, the seismic source is a microseismic event caused by the fracturing process.

The seismic source 124 is configured to generate a set of the surface waves (hereinafter collectively referred to as the surface waves and individually referred to as the surface wave) within the reservoir 102. As used herein, the term "surface waves" refers to the seismic waves that travel along the surface of the earth, in contrast to compressional waves, which travel through an interior of the earth. The surface waves may be, for example, Rayleigh waves and Love waves. The generated set of surface waves includes a plurality of frequencies (hereinafter collectively referred to as the frequencies and individually referred to as the frequency) in a frequency band of interest. In an aspect, the frequency band of the interest lies in a range of 10 Hertz (Hz) to 30 Hz.

For example, when the seismic source 124, such as an explosive charge or air gun, is placed near the surface or at the surface, the explosive charge generates seismic energy that travels in the form of the surface waves through and along the surface of the reservoir 102. The seismic source 124 is also configured to generate a set of compressional waves (hereinafter referred to as the compressional waves or the body waves). In an aspect, the compressional waves may be propagated outward in all directions from the seismic source 124 through the subsurface of the earth and be reflected from underground features towards the surface of the earth.

The near surface array 114 is installed at the surface of the reservoir 102. The near surface array 114 includes at least one seismic receiver 120 (hereinafter referred to as the seismic receiver 120) placed at a distance d from the seismic source 124. The seismic receiver 120 is configured to receive the surface waves generated by the seismic source 124. For example, when the surface waves propagate outward from the seismic source 124 along the surface of the earth, the surface waves induce vibrations in the ground. For example, the surface waves cause particles in the ground to move in horizontal patterns, primarily along the surface. The seismic receiver 120 detects ground vibrations caused by the surface waves and converts the ground vibrations into electrical signals (i.e., seismic signals). In an aspect, the electrical signals represent characteristics of the surface waves and are recorded as waveforms. The characteristics of the surface waves may be, but are not limited to, the amplitude, the frequency, the phase, time of arrival and the like. In an aspect, the electrical signal may be a combination of all the frequencies that create a waveform. For example, the waveform represents how the ground motion changes over time, with the amplitude of the surface wave indicating a strength of the vibration and the frequency representing a type of the surface wave.

The seismic receiver 120 is any one of a geophone, an accelerometer and a seismometer. In an aspect, the geophone is configured to record components of particle ground velocity (i.e., a rate of change of displacement over time). For example, the geophone is used to measure horizontal or vertical velocity components of the surface waves.

The accelerometer is configured to record particle ground acceleration (i.e., a rate of change of velocity over the time). For example, when the surface waves cause the vibrations in the ground, the accelerometer detects the vibrations with a high sensitivity, especially for high-frequency surface waves. Further, the seismometer is configured to record displacement (i.e., an absolute movement of the ground) and strain (i.e., deformation of the ground due to stress). For example, as the surface waves travel, the surface waves induce ground displacement. The seismometer records the ground displacement and provides insights into the characteristics of the surface waves. Also, the seismometer measures the strain, which indicates how much the ground is stretched or compressed by the surface wave.

The seismic receiver 120 is also configured to record a time of arrival of a smallest frequency f1 of the corresponding surface waves. In seismology, a smallest frequency f1 component of the surface wave generally arrives first due to having a longer wavelength, which enables the surface wave of the smallest frequency f1 to travel faster than higher frequency surface waves. In an aspect, the time of arrival of the smallest frequency f1 is determined by detecting an onset of the surface wave (i.e., a moment when the surface wave first arrives) at the seismic receiver 120. The onset of the surface wave is detected by analyzing the recorded waveform (i.e., the electrical signals), where a point of initial arrival of the surface wave is marked as a first significant deviation in the amplitude from a background noise. Since the smallest frequency f1 component has the longest wavelength WL, therefore, the surface wave of the smallest frequency f1 reaches the seismic receiver 120 first. In other words, the time of arrival is automatically or manually identified by analyzing the recorded waveform, by noting a specific moment when the surface wave first causes noticeable ground motion. In another aspect, for all other frequencies (f2, f3, f4, and the like), the seismic receiver 120 may also record the time of arrival of each corresponding surface wave. In an aspect, the time of arrival of the smallest frequency f1 and all other frequencies (f2, f3, f4, and the like) of the corresponding surface waves may be recorded in an internal memory (not shown) of the seismic receivers 120. The seismic receivers 120 may be configured to transmit the characteristics of the surface waves in the form of the electrical signals to the computing device 128. The characteristics of the surface waves may be, but not limited to, the frequencies of the corresponding surface waves, the amplitude of the surface waves, the time of arrival of the smallest frequency f1 and all other frequencies (f2, f3, f4, and the like) of the corresponding surface waves.

Further, the seismic receiver 120 is also configured to receive the compressional waves from the seismic source 124. In an aspect, the compressional waves travel through the interior of the earth and reach the seismic receiver 120 after propagating through and reflecting from subsurface layers. As the compressional waves reach the seismic receiver 120, the compressional waves induce the vibrations in the ground and cause the particles in the ground to move back and forth in a direction of a wave propagation. The seismic receiver 120 detects the vibrations caused by the compressional waves and converts the vibrations into the electrical signals. The electrical signals represent the characteristics of the compressional waves reaching the seismic receiver 120. The characteristics of the compressional waves may be but are not limited to, the amplitude, the frequency, the phase, the time of arrival and the like.

The computing device 128 is operatively connected to each of the seismic receivers 120 by the antenna 126. In an aspect, the antenna 126 serves as a medium for wireless communication between the seismic receiver 120 and the computing device 128. An antenna 126 may be located on both the seismic receiver 120 and on the computing device 128 for sending and receiving the electrical signals wirelessly. The antenna (acting as a transmitter) 126 on the seismic receiver 120 may transmit the electrical signals associated with the surface waves to the computing device 128. For example, the seismic receiver 120 may transmit electrical signals through a radio frequency (RF) signal. In another aspect, the seismic receiver 120 may transmit the electrical signals through a wireless communication technology such as, but not limited to, wireless fidelity (Wi-Fi), Bluetooth, and the like. Further, the antenna (acting as a receiver) 126 on the computing device 128 receives the electrical signals wirelessly. The antenna 126 may be, but is not limited to, a dipole antenna, a patch antenna, an omnidirectional antenna, and the like. Aspects of the present disclosure are intended to include or otherwise describe any type of conventional antenna used in communication technologies.

The computing device 128 includes an electrical circuitry 132, the memory 134, and at least one processor 136 (hereinafter referred to as the processor 136). The electrical circuitry 132 is configured to enable the processor 136 to communicate with other components, such as the seismic receiver 120. In an aspect, the electrical circuitry 132 ensures that the processor 136 reads the data received from each of the seismic receivers 120. In another aspect, the electrical circuitry 132 may also enable the processor 136 to transmit processed data (i.e., a calculated longest wavelength WL) to other components of the system 122. In yet another aspect, the electrical circuitry 132 may also ensure that the processor 136 has the necessary power and clock signals to perform tasks associated with the system 122. The electrical circuitry is configured with a communications circuit, such as a transceiver, to receive, timestamp and transmit the processed data as needed within the drilling system or to a remote monitoring station.

The memory 134 is configured to store a near surface velocity model 138, the characteristics such as the amplitudes, the frequencies and the phases of the surface waves, the time of arrival of the smallest frequency f1 and other frequencies (f2, f3, f4, and the like) of the surface waves, and the distance of the at least one seismic receiver 120 from the seismic source 124. The memory 134 is also configured to store computer-readable program instructions for determining the depth z in the monitoring borehole 108 for installing the borehole receivers 116. The memory 134 may include any computer-readable medium known in the art including, for example, a static random-access memory (SRAM), a read only memory (ROM), an erasable programmable ROM, flash memories, hard disks, optical disks, magnetic tapes, and the like. Aspects of the present disclosure are intended to include or otherwise cover any type of the memory 134, including known, related art, and/or later developed technologies.

The processor 136 is configured to fetch and execute the computer-readable program instructions stored in the memory 134. The processor 136 is configured to execute a sequence of machine-readable instructions, which may be embodied in a program or software. The instructions can be directed to the processor 136, which may subsequently execute the instructions to implement methods of the present disclosure. The processor 136 may be implemented as one or more microprocessors, microcomputers, microcontrollers, digital signal processors, central processing units, state machines, logic circuitries, and/or any devices that manipulate signals based on operational instructions.

In one aspect, the computing device 128 is configured to perform all functions associated with system 122 through processor 136, which executes the program instructions.

The computing device 128 is configured to determine the smallest frequency f1 of the frequencies. In an aspect, the computing device 128 may be configured to determine the smallest frequency f1 by analyzing the time of arrival of all the frequencies that are stored in the memory 134. The computing device 128 may be configured to identify the frequency of all the received frequencies having an earliest time of arrival, indicating the smallest frequency f1 of all other frequencies. In an aspect, the computing device 128 may use various mathematical techniques or bandpass filters to decompose the received electrical signals into individual frequency components. In such aspect, the computing device 128 isolates the frequencies that may be in the frequency band of interest and filters out any frequencies outside the frequency band of interest. In an aspect, the computing device 128 is configured to determine the smallest frequency f1 present in the electrical signal from the isolated frequencies. For example, the smallest frequency f1 may be determined by arranging the isolated frequencies in an increasing order.

The computing device 128 is further configured to determine a surface wave velocity v for the smallest frequency f1. In an aspect, the computing device 128 is configured to determine the surface wave velocity v for the smallest frequency f1 by dividing the distance between the seismic source 124 and the at least one seismic receiver 120 by the time of arrival of the smallest frequency f1. For example, if the distance between the seismic source 124 and the at least one seismic receiver 120 is represented by d and the time of arrival of the smallest frequency f1 is represented by ta respectively, then the surface wave velocity v for the smallest frequency f1 is determined by using an equation (1) as:

$$v = d/f1, \quad (1)$$

where v represents the surface wave velocity for the smallest frequency f1.

In another aspect, the computing device 128 is configured to determine the surface wave velocity v of the smallest frequency f1 by using the near surface velocity model 138 stored in the memory 134. The near surface velocity model 138 is a data representation that captures velocity characteristics of the surface waves as the surface waves travel through near surface layers of reservoir 102. In an aspect, the near surface velocity model 138 is constructed based on measurements obtained by at least one of geophysical measurement techniques such as interferometry measurements, sonic log measurements, near surface seismic multi-channel analysis of surface waves (MASW) and refraction measurements. In an aspect, the near surface velocity model 138 may be constructed by gathering data associated with the near surface layers of the reservoir 102 using the geophysical measurement techniques.

For example, the interferometry measurements may provide information on the velocities between two surface points and travel times between the seismic receivers 120. Also, the sonic log measurements may provide the information on the velocities at specific depths in a borehole. The near surface MASW may provide information on velocity variations for different frequencies at increasing depths, and the refraction measurements may provide information on the velocities at interfaces of the layers, such as 300 meters per second (m/s) for a first layer and 600 m/sec for a second layer.

For example, to construct the near surface velocity model 138, the velocities of the surface waves at the different frequencies may be calculated using the seismic data recorded at the seismic receivers 120. In this example, the surface waves are generated by the seismic source 124 and recorded by the seismic receivers 120, which are spaced apart at known distances. The recorded seismic signals are filtered into specific frequency bands, and group arrival times of the surface waves within each frequency band are determined. Using the known distances between the seismic receivers 120 that may be corrected for a wave propagation geometry, the velocities of the surface waves at each frequency are calculated by dividing the distances by differences in the arrival times. These velocities are plotted against their corresponding frequencies to generate a dispersion curve, which shows how velocity varies with the frequency. The dispersion curve is then inverted using numerical methods to derive a velocity structure (the near surface velocity model 138) as a function of the depth. The near surface velocity model 138 provides a layered representation of subsurface properties, where lower frequencies correspond to deeper layers and higher frequencies correspond to shallower layers.

In an aspect, the computing device 128 is configured to receive the distance of the at least one seismic receiver 120 from the seismic source 124. In an example, the computing device 128 may be configured to fetch the distance of the at least one seismic receiver 120 from the seismic source 124 from the memory 134. For example, each seismic receiver 120 in the near surface array 114 may be assigned a unique identifier (ID) for identification. The computing device 128 may be configured to fetch the distance of the corresponding seismic receiver 120 from the seismic source from the memory 134 based on the unique ID of the corresponding seismic receiver 120.

In another aspect, the computing device 128 is configured to calculate the distance of the at least one seismic receiver 120 from the seismic source 124. In an aspect, the computing device 128 is configured to calculate the distance by using coordinates of the seismic source 124 and the at least one seismic receiver 120. In an aspect, a position of the seismic source 124 is either fixed or predetermined. For example, the seismic source 124 may be at a specific location on the surface or at a defined point in the reservoir 102. Similarly, the position of the seismic receiver 120 is either known or measured using positioning systems. Once the position of the seismic source 124 and the seismic receiver 120 is determined, the computing device 128 may use an Euclidean distance formula to calculate the distance between the seismic source 124 and the at least one seismic receiver 120. For example, for the coordinates of the seismic source 124 is $(x_s, y_s, z_s)$ and the coordinates of the at least one seismic receiver 120 is $(x_r, y_r, z_r)$, the distance d is calculated by using a below-defined equation (2) as:

$$d = \sqrt{(x_r-x_s)^2} + \sqrt{(y_r-y_s)^2} + \sqrt{(z_r-z_s)^2}, \qquad (2)$$

where d is the distance between the seismic source 124 and the at least one seismic receiver 120.

In an aspect, the computing device 128 is configured to receive the amplitude and the time of arrival of each surface wave from the seismic receivers 120. In such aspect, the computing device 128 may be configured to store and later fetch the amplitude and the time of arrival of each surface wave from the memory 134. In another aspect, the computing device 128 is configured to calculate the amplitude and the time of arrival of each surface wave generated by the seismic source 124. In an aspect, the computing device 128 is configured to calculate the amplitude and the time of arrival of each of the surface waves based on the electrical signals (i.e., the waveforms) received from the seismic receiver 120. The computing device 128 may be configured to analyze the waveforms recorded by the seismic receiver 120 to detect the onset of the corresponding surface waves at the seismic receiver 120. The initial arrival of each of a frequency component is marked by the significant deviation in the amplitude from the background noise. Each frequency component causes a distinct time of arrival based on a wavelength and propagation characteristics. While the surface wave of the smallest frequency f1 arrives first, surface waves of a higher frequency follow the surface wave of the smallest frequency f1. The computing device 128 is configured to record the time of arrival of each of the corresponding surface waves separately.

In an aspect, the computing device 128 may be configured to process the electrical signals by using signal processing techniques to identify a maximum ground displacement in the electrical signals. Based on the identified maximum ground displacement, the computing device 128 is configured to calculate the amplitude of each surface wave. The maximum ground displacement is recorded by the seismic receiver 120 by analyzing the vibrations generated by the surface waves during the propagation. For example, the seismic receivers 120 such as, the geophones or the accelerometers detect the vibrations caused by the surface waves and record the vibrations as the vibrations correspond to the amplitude of the surface waves.

For example, if the surface wave causes the ground to move by 0.7 centimeters (cm) at a certain location, then the amplitude of the surface wave may be 0.7 cm. The amplitude may vary depending on the distance d between the seismic source 124 and the seismic receiver 120, a medium through which the surface wave travels and the like.

In another aspect, the computing device 128 may be configured to determine the amplitude of each surface wave by first identifying an equilibrium position of the surface wave, which is represented by a centerline of the waveform on a graph. Further, the computing device 128 may be configured to locate a peak (i.e., a highest point) or a trough (i.e., a lowest point) of the surface wave. Once the peak and the trough are located, the computing device 128 may be configured to measure the distance from the equilibrium position to either the peak or the trough, which represents the amplitude of the surface wave.

Further, the computing device 128 is configured to compare each time of arrival of each of the surface waves to the near surface velocity model 138. In an aspect, the computing device 128 may be configured to perform a comparison to match the calculated time of arrival and the amplitude of each of the surface waves with expected behavior of the surface waves in the near surface layers that are predicted by the near surface velocity model 138. In an aspect, the computing device 128 may be configured to compare the time of arrival of each of the surface waves with an expected travel time based on the velocities from the near surface velocity model 138. For example, the expected travel time for the surface waves may be calculated by using an equation (3):

$$T = \frac{d}{V}, \qquad (3)$$

where T represents the expected travel time for the surface waves, d is the distance between the seismic source 124 and the seismic receiver 120 (i.e., the distance traveled by the surface wave), and V is the velocity of the surface wave at a specified depth collected from the near surface velocity model 138.

The computing device 128 may be configured to compare the time of arrival of each of the surface waves with the excepted travel time based on the near surface velocity model 138 for a corresponding layer at the specified depth. For example, if the surface wave arrives at the seismic receiver 120 at the specific time, then the computing device 128 checks the near surface velocity model 138 for an expected velocity at that depth and compares a time against an actual observed time.

For instance, suppose the distance d between the seismic source 124 and the seismic receiver 120 is 200 m and the near surface wave velocity model 138 indicates that the surface wave velocity V at the specific depth is 100 m/s, then the computing device 128 calculates the expected travel time by using equation (3):

$$T = \frac{200}{100}$$
$$T = 2s$$

Further, if the observed time of arrival of the surface wave at the seismic receiver 120 is 2.1 sec, then the computing device 128 compares the observed time of arrival (2.1 s) with the expected travel time (2 s) from the near surface wave velocity model 138. By analyzing this discrepancy, the computing device 128 may identify whether the surface wave is behaving as predicted by the near surface wave velocity model 138 or if there are any anomalies in the subsurface layers.

In an aspect, the computing device 128 is configured to determine the surface wave velocity v for the smallest frequency f1 from the near surface velocity model 138 when the calculated time of arrival of each of the surface waves is matched with the expected travel time. In such aspect, the computing device 128 is configured to determine the surface wave velocity v for the smallest frequency f1 using equation (1). Here, in equation (1), the time of arrival of the smallest frequency f1 is replaced by the time of arrival of each of the surface waves. In another aspect, the computing device 128 is configured to recalculate the near surface velocity model 138 until the calculated time of arrival and the expected travel time of the near surface velocity model 138 match.

The computing device 128 is further configured to calculate the longest wavelength WL of the surface wave in the frequency band of interest based on the surface wave velocity v and the smallest frequency f1 as defined in equation (4):

$$WL = \frac{v}{f1} \quad (4)$$

Further, the drilling system 130 is configured to install at least one borehole receiver 116 in the monitoring borehole 108 at the depth z that is equal to the longest wavelength WL. The drilling system 130 may be equipment such as, but not limited to, a rotary drilling rig, a wireline drilling system, and the like which is configured to lower the borehole receiver into the monitoring borehole on a cable. For example, the drilling system 130 may be configured to drill a borehole to the depth z for installing the borehole receivers 116 into the drilled borehole using a drill rig. After drilling, the borehole receivers 116 may be lowered carefully at the depth z, ensuring optimal placement for accurate detection of the seismic signals. Once the borehole receivers 116 reach the depth z, the drilling system 130 may be configured to anchor the borehole receivers 116 within the borehole to ensure minimal movement. Upon installation, the borehole receiver 116 is configured to detect the seismic signals generated by activities like the hydraulic fracturing. The borehole receiver 116 is installed at the depth z corresponding to the longest wavelength WL, which is a target zone where the seismic activity is expected to be most detectable.

In an aspect, the borehole receiver 116 may be installed to detect the seismic signals such as, the surface waves, the compressional waves and the like that may be generated by the microseismic events that occurred as a result of the multi-stage fracturing 104 (as shown in FIG. 1A). In an aspect, multiple borehole receivers 116 may be placed in multiple boreholes. In another aspect, the borehole receivers 116 may be placed in an array. In an aspect, the borehole receiver 116 may be a short-period geophone. In another aspect, the borehole receiver 116 may be the accelerometer. The borehole receiver 116 may be a three-component seismic receiver that includes a vertical component, a horizontal north-south component, and a horizontal east-west component. For example, the vertical component of the borehole receiver 116 measures the seismic waves that move up and down (i.e., corresponding to the P-waves or the compressional waves).

The horizontal north-south component measures the seismic waves that move horizontally in a north-south direction (i.e., corresponding to the S-waves or shear waves). The horizontal east-west component measures the seismic waves that move horizontally in an east-west direction (i.e., corresponding to the S-waves or the shear waves).

Further, the borehole receiver 116 is configured to transmit the seismic signals to the computing device 128. The computing device 128 is configured to process the seismic signals to identify and characterize the microseismic events caused by the multi-stage fracturing 104. In an aspect, the computing device 128 may use techniques such as the signal processing, a waveform analysis and the like for identifying the microseismic events from the seismic signals.

The computing device 128 is further configured to determine a noise amplitude $A_0$ of the surface waves. As used herein, the noise amplitude $A_0$ of the surface waves refers to a strength or a magnitude of an unwanted seismic signal from the surface waves that reach the seismic receiver 120.

In an aspect, the computing device 128 may be configured to receive the surface waves in the form of electrical signals. The computing device 128 may be configured to determine sections of the electrical signals where the surface wave is not present and measure the amplitude of these electrical signals. The measured signals represent the noise amplitude $A_0$ of the surface waves.

Similarly, the computing device 128 is configured to determine a noise amplitude $A_1$ of each of the compressional waves. In an aspect, the computing device 128 is configured to receive the compressional waves in the form of electrical signals. The computing device 128 may be configured to determine the sections of the electrical signals where the compressional wave is not present and measure the amplitude of these signals. Such signals may provide the noise amplitude $A_1$ of each of the compressional waves.

Further, the computing device 128 is configured to calculate a seismic noise level N(z) received by the borehole receiver 116 at the depth z. The seismic noise level N(z) may represent an amount of seismic noise that the borehole receiver 116 may receive at the depth z in the monitoring borehole 108. The seismic noise level N(z) may be crucial for determining how much unwanted seismic signal is recorded by the borehole receivers 116, which may affect the accuracy of seismic measurements. The seismic noise level N(z) is calculated by using an equation (5) as defined below:

$$N(z) = A_0 e^{-\alpha z f} + \frac{A_1}{Z}, \quad (5)$$

where $A_0$ is the noise amplitude of the surface waves, $A_1$ is the noise amplitude of the compressional waves, z is the depth at which the borehole receiver 116 is installed, a is a coefficient which is a function of the near surface velocity model 138, f is the frequency of the surface waves and z in the denominator for $A_1$ shows that the noise of the compressional wave decreases with the depth, but at a slower rate than the noise of the surface wave. $A_0 e^{-\alpha z f}$ represents the noise of the surface wave, which decays exponentially with the depth and $A_1/z$ represents the noise from the compressional wave, which decays more slowly with the depth.

The noise trapped in the surface waves penetrates deeper for low-frequency waves; however, below approximately one wavelength, the surface waves no longer have a significant impact on the seismic noise levels. In an aspect, equation (5) is valid for depths greater than 1, therefore a total noise is a sum of the noise of the surface wave and the noise of the compressional wave as defined below in equation (6):

$$N(0)=N(1)=A_0+A_1. \quad (6)$$

Further, the computing device 128 is configured to calculate a signal-to-noise ratio SNR(z) at the depth z of the borehole receiver 116. The SNR (z) is calculated by using equations (7), (8) and (9):

$$S(z)=B_0, \quad (7)$$

$$SNR(z) = \frac{S(z)}{N(z)}, \quad (8)$$

-continued
$$SNR(z) = \frac{B_0}{\left(A_0 e^{-\alpha z f} + \frac{A_1}{z}\right)}, \quad (9)$$

where S(z) represents a signal amplitude approximated as a constant $B_0$ for the depths below the surface, based on the determination that the signal amplitude does not change significantly with the depth. $B_0$ is the constant representing an approximation of the signal amplitude of the compressional waves received by the borehole receiver 116. Equation (9) represents that the amplitude noise $A_0$ from the surface waves decays exponentially with the depth and the amplitude noise $A_1$ from the compressional wave decays linearly with the depth.

In an aspect, equation (9) behaves differently based on the depth z. For example:

$$SNR(z) = C\ z;\ \text{for } z \gg 1 WL. \quad (10)$$

In equation (10), the SNR (z) increases linearly for the borehole receivers 116 located at one wavelength WL or greater beneath the surface of the ground.

$$SNR(z) = D\ e^{\alpha z f};\ \text{for } 1 < z < WL, \quad (11)$$

In equation (11), the SNR (z) increases exponentially with the depth z for the seismic receivers located less than one wavelength WL beneath the surface of the ground.

In equations (10) and (11), $\alpha$ is 1/WL, $B_0$, C, and D can be determined from taking noise level measurements at a location beneath the surface of the ground and solving for $B_0$, C, and D.

EXAMPLE

Initially, an experiment was conducted where the data of the seismic noise was collected from a seismic array in the Groningen area, Netherlands. From the experiment, it was found that the seismic noise is primarily influenced by the surface waves at the shallow depths, particularly at the locations of the seismic receiver 120 (as shown in FIG. 1A). However, it is also observed that anthropogenic noise (man-made noise) penetrates to greater depths (at least 200 m) and is consistent with the compressional waves, which are more capable of propagating through the subsurface.

From the conducted experiment, it was concluded that the surface waves dominate noise levels at the shallow depths, but their influence diminishes below approximately 50 m. At the depths greater than 50 m, the compressional waves, which are less affected by the surface, become a dominant source of the noise.

Additionally, data obtained from the Frontier Observatory for Research in Geothermal Energy (FORGE) Geothermal experiment was analyzed, which confirmed that the levels of the seismic noise observed in the top 50 m follow an amplitude decay pattern of the surface waves. From the experiment, it was also observed that the seismic noise primarily decays as the surface waves for the depths less than about one wavelength WL. Below this depth, the seismic noise begins to decay as vertically propagating compressional waves and decays linearly with the depth.

Further, an experiment was conducted using the data from the near surface array 114 (as shown in FIG. 1A) in the Groningen area, Netherlands. A dataset which included publicly available records from 2019 and 2022, was analyzed to generalize findings. The data from four selected monitoring stations were utilized, with each station equipped with five three-component borehole receivers 116 (as shown in FIG. 1A) installed at the depth z ranging from the surface to 200 m in the 50 m interval. In this experiment, the seismic receivers 120 were the accelerometers (such as broadband sensors, and echoplanar imaging (EpiS)), while the borehole receivers 116 were short-period geophones. Also, accelerometer data were converted to particle velocity by integration.

In the conducted experiment, the noise levels were characterized by the 90th percentile of absolute amplitudes of recorded noise over selected periods to mitigate the influence of random spikes. The amplitudes were measured on a vertical component and as the amplitude of the vectorial sum of horizontal components. Assuming that the seismic noise is dominated by a narrow band of the surface waves, an amplitude decay with the depth was modeled using an exponential decay equation, as shown in an equation (12).

$$|A(x,y,z,f)| = A(x,y,0,f) e^{(-\alpha(f,m)\cdot z)} \quad (12)$$

where A (x,y,z,f) represents the amplitude at the location described by Cartesian coordinates x,y,z and at frequency f, $\alpha(f, m)$ represents a positive coefficient that depends on the frequency and a velocity and density model m.

The velocity and density model may be summarized in Table 1:

TABLE 1

| Velocity and Density Model | | | |
| --- | --- | --- | --- |
| Layer bottom (m) | S-wave velocity (m/s) | P-wave velocity (m/s) | Density (kg/m³) |
| 300 | 500 | 1500 | 2000 |
| 1000 | 1000 | 2400 | 2400 |
| Less than 2000 | 2500 | 4300 | 2600 |

The velocity and density model served as a baseline for understanding the decay behavior of the seismic noise.

The experiment was further conducted to study the effect of the depth z of the installed borehole receiver 116 on the SNR (z), considering both the decrease in the noise with the increasing depth and the simultaneous enhancement of the strength of the signal near the surface. The data was collected from four different sites, marked as G320, G700, G690, and G660, during June and December 2019. In a pre-processing phase, measurements recorded by a measuring instrument were corrected, and particle acceleration measured by the seismic receivers 120 was integrated to obtain the particle velocity. Further, seismic recordings were bandpass filtered between 4.5 Hz and 15 Hz to address instrument limitations and focus on a frequency range that was useful for seismic monitoring of the surface. In the experiment, the noise levels were quantified as the 90th percentile of absolute amplitude values calculated hourly.

The noise level on the surface at the different sites exhibited a similar character: lower levels were observed during weekends and holidays, indicating an anthropogenic origin. Ratios between the noise levels recorded at the seismic receivers 120 and shallow borehole receivers 116 were determined for each site. Results showed that an attenuation of the noise was highest between the seismic receivers 120 and those at 50 m depth, with the ratios significantly exceeding those observed between the borehole receivers 116 at the greater depths. These ratios ranged from 0.9 to 2 in deeper borehole receivers 116. This pattern was inconsistent with the exponential decay of the noise levels predicted by equation (5), i.e., the first part of equation (5), the term $A_0 e^{-\alpha z f}$, as similar observations were noted for horizontal components as well. Furthermore, this pattern was independent of the season, as consistent trends were observed in both the June and the December 2019. The dominant seismic noise in a 5 Hz-15 Hz band was therefore attributed to anthropogenic activity rather than natural sources like wind or ocean waves, aligning with previous studies that attribute seasonal variations to frequencies below 1 Hz.

To analyze the SNR (z), three seismic events that occurred during the experiment were selected. Root Mean Square (RMS) value of the signal amplitude over half a period was divided by an RMS value of the noise measured over a time interval ten times a signal duration. The noise levels were measured three seconds before the identified P-wave arrival.

Figure 2A:
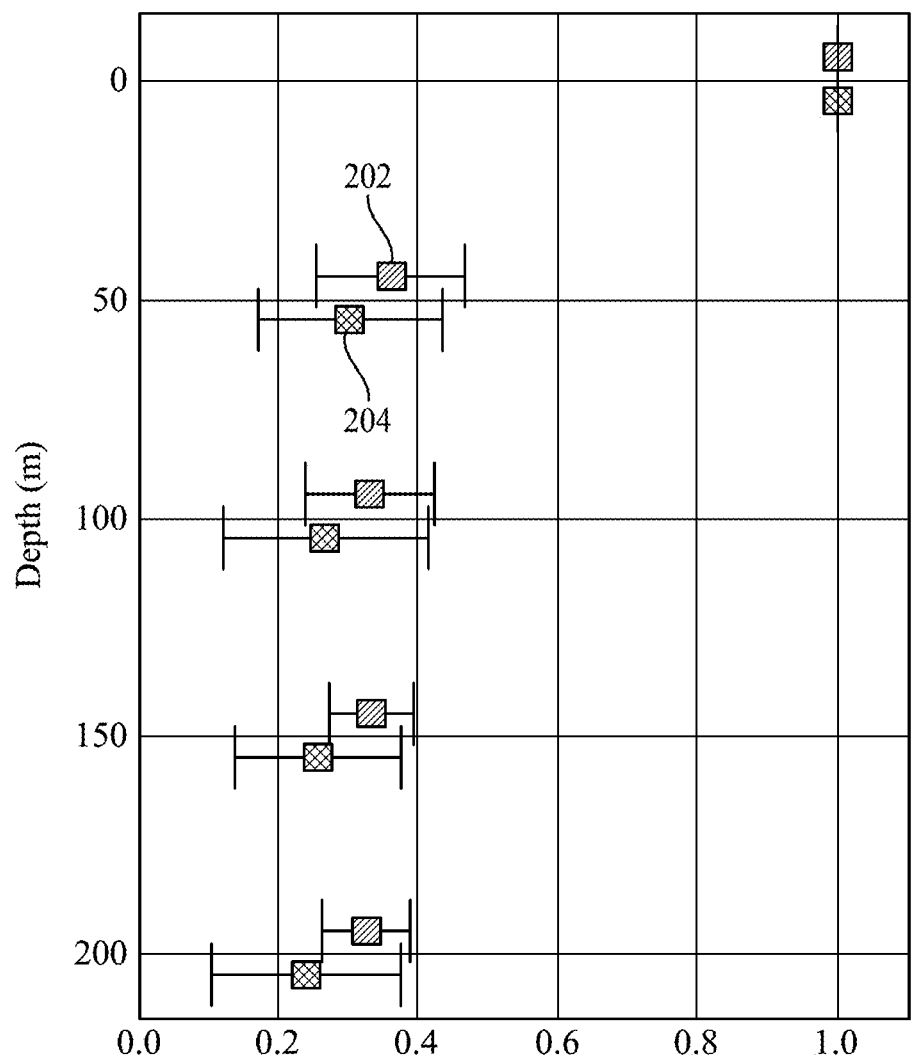
FIG. 2A illustrates a graphical representation of an average deviation and a standard deviation of normalized values of a signal and a seismic noise observed from seismic events, according to certain embodiments.

FIG. 2A illustrates a graphical representation 200 of an average and a standard deviation of normalized values of a signal 202 and a noise 204 observed from seismic events. The normalized values of the signal 202 and the noise 204 were analyzed separately to understand their respective attenuation patterns with the depth. It was observed that the attenuation of the signal 202 and the noise 204 exhibited the similar trends, but with notable differences between the depths. From the surface to the depth of 50 m, the largest attenuation is observed, with the amplitude of the signal 202 decreasing by a factor ranging from 1.9 to 6.3 times and the amplitude of the noise 204 reducing more significantly by a factor ranging from 1.9 to 9.7 times. This observation indicates that a reduction of the noise 204 is greater than a reduction of the signal 202, which leads to an improved SNR (z) in deeper regions. Further, in between the borehole receivers 116 (as shown in FIG. 1B) that are located deeper (e.g., 50 m to 200 m) in the monitoring borehole 108 (as shown in FIG. 1A), both the reduction in the signal 202 and the noise 204 is more moderate as the depth increases beyond 50 m. Here, the amplitude of the signal 202 decreases by the factor ranging from 0.6 to 1.9 times and the amplitude of the noise 204 decreases by 0.4 to 2.3 times. On average, the noise 204 attenuates more rapidly than the signal 202, resulting in a higher SNR (z) with the depth. Additionally, the standard deviation of the signal 202 is smaller (i.e., the signal 202 is less scattered) as compared to the noise 204 at the greater depths, indicating more consistent and reliable signal 202 measurements in deeper borehole regions. These findings highlight an importance of the depth in optimizing the SNR (z), as the attenuation of the noise 204 generally outpaced the reduction in the strength of the signal 202.

Figure 2B:
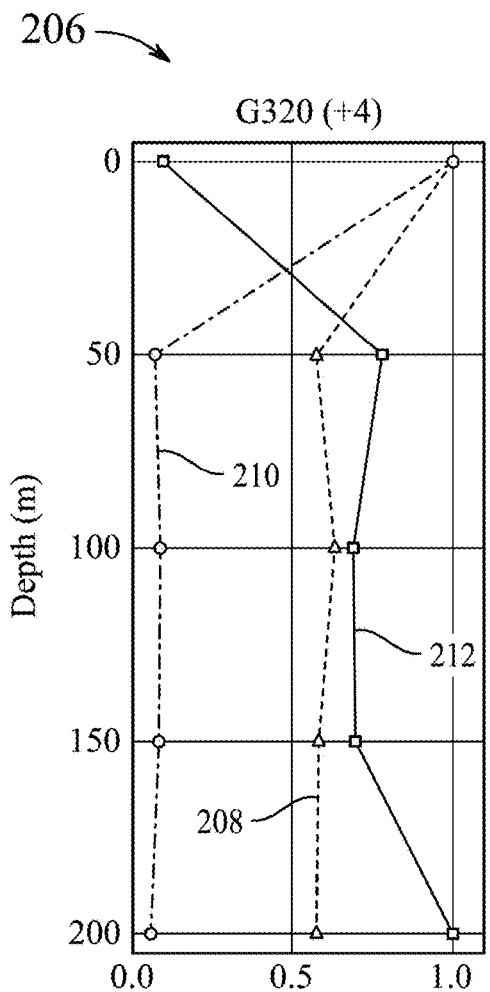
FIG. 2B illustrates a graphical representation of signal-to-noise ratio SNR (z) for a seismic event having a magnitude of 2.3 measured at varying depths, according to certain embodiments.

FIG. 2B illustrates a graphical representation 206 of SNR (z) 212 for a first seismic event measured at the varying depths. FIG. 2B represents the measurements of the SNR (z) 212 for the first seismic event with a magnitude of 2.3 at site G320 (+4) in the Groningen, the Netherlands. The SNR (z) 212 is shown to significantly improve at the depth of 50 m, which corresponds to approximately one wavelength for a 5 Hz surface wave based on an observed surface wave velocity v of approximately 250 m/s in an area. At the depth of 50 m, the amplitude of a noise 210 at this depth was found to be 4 to 10 times smaller than at the surface. In contrast, the amplitude of a signal 208 remains relatively stable but begins to show slight reductions at the greater depths. This reduction in the noise 210 of the surface wave leads to a substantial increase in the SNR (z) 212 at 50 m, with only slight further improvements observed at the greater depths.

Figure 2C:
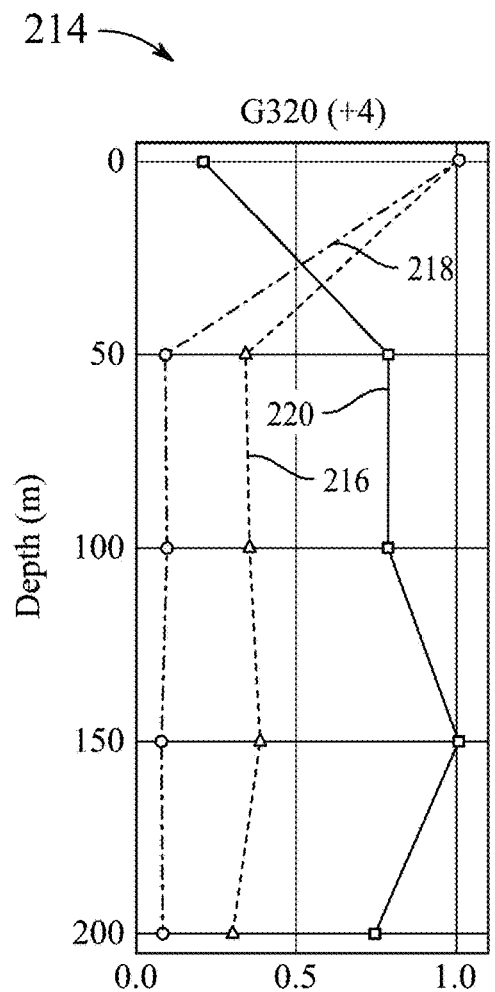
FIG. 2C illustrates a graphical representation of signal-to-noise ratio SNR (z) for a seismic events having a magnitude of 3.1 measured at varying depths, according to certain embodiments.

FIG. 2C illustrates a graphical representation 214 of SNR (z) 220 for a second seismic event measured at the varying depths. FIG. 2C represents the measurements of the SNR (z) 220 for the second seismic event with a magnitude of 3.1 at site G320 (+4) in the Groningen area, Netherlands. The SNR (z) 220 improves significantly with increasing depth, particularly at 50 m, where the amplitude of noise 218 was found to be 4 to 10 times smaller than at the surface. Meanwhile, the amplitude of signal 216 remains relatively stable and begins to show a slight reduction at greater depths, similar to the first seismic event. The second seismic event, having a higher magnitude of 3.1, generates a stronger signal 216 compared to the first seismic event, resulting in a higher SNR (z) 220 across all the depths as compared to the first seismic event.

Figure 3:
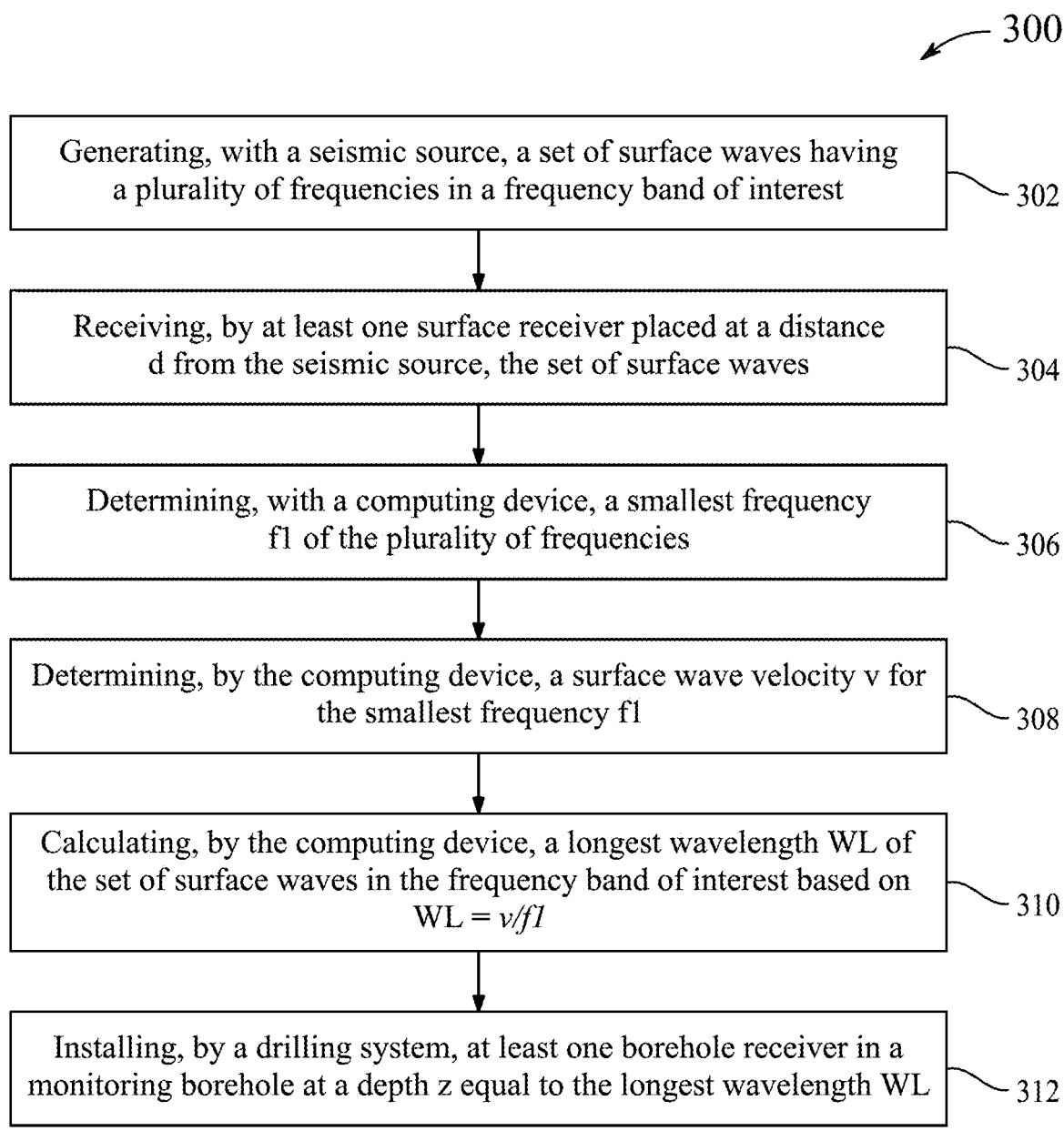
FIG. 3 illustrates a flowchart of a method for installing the borehole receiver in the monitoring borehole, according to certain embodiments.

FIG. 3 illustrates a flowchart of a method 300 for installing the borehole receivers 116 in the monitoring borehole 108, according to certain embodiments. The method 300 includes a series of steps. These steps are only illustrative, and other alternatives may be considered where one or more steps are added, one or more steps are removed, or one or more steps are provided in a different sequence without departing from the scope of the present disclosure.

At step 302, the method 300 includes generating, with the seismic source 124, the set of surface waves having the plurality of frequencies in the frequency band of interest. In an aspect, the frequency band of interest may be in a range of 10 Hz to 30 Hz. In an example, when the seismic source 124 is placed at or near the surface, the seismic source 124 generates the seismic energy that travels in the form of the surface waves along with the surface of the reservoir 102 to reach the seismic receiver 120.

At step 304, the method 300 includes receiving, by the at least one seismic receiver 120 placed at the distance d from the seismic source 124, the set of surface waves. For example, when the surface waves propagate outward from the seismic source 124 along the surface of the earth, the surface waves induce the vibrations in the ground as the surface waves pass through the location of the seismic receiver 120. In an example, the surface waves cause the particles in the ground to move in the horizontal patterns, primarily along the surface. The seismic receiver 120 detects the ground vibrations caused by the surface waves and converts the ground vibrations into the electrical signals. In an aspect, the electrical signals represent the characteristics of the surface waves and are recorded as the waveforms. In an aspect, the seismic receiver 120 is one of the geophones, the accelerometer and the seismometer used for measuring the motion of the ground as the surface wave passes.

In this step, the method 300 also includes receiving the compressional waves from the seismic source 124. In an aspect, the compressional waves travel through the interior of the earth and reach the seismic receiver 120 after propagating through the subsurface layers. As the compressional waves reach the seismic receiver 120, the compressional waves induce vibrations in the ground and cause the particles in the ground to move back and forth in the direction of the wave propagation. The seismic receiver 120 detects the vibrations caused by the compressional waves and converts the vibrations into the electrical signals. The electrical signals represent the characteristics of the compressional waves at the location of the seismic receiver 120.

At step 306, the method 300 includes determining, with the computing device 128 operatively connected to each seismic receiver 120, the smallest frequency f1 of the plurality of frequencies. The computing device 128 includes the electrical circuitry 132, the memory 134 storing the program instructions and the at least one processor 136 configured to execute the program instructions. In an aspect, the computing device 128 is operatively connected to each seismic receiver 120 by the antenna 126. The step 306 of determining the smallest frequency f1 includes using the mathematical techniques or the bandpass filters to decompose the received electrical signals into the individual frequency components. The step 306 further includes isolating the frequencies that may be in the frequency band of interest to determine the smallest frequency f1 present in the electrical signal from the isolated frequencies.

At step 308, the method 300 includes determining, by the computing device 128, the surface wave velocity v for the smallest frequency f1. The step 308 includes recording the time of arrival of the surface wave having the smallest frequency f1 at the at least one seismic receiver 120. In an aspect, the time of arrival of the smallest frequency f1 is determined by detecting the onset of the surface wave at the seismic receiver 120. The onset of the surface wave is detected by analyzing the recorded waveform, where the point of the initial arrival of the surface wave is marked as the first significant deviation in the amplitude from the background noise. Since the smallest frequency f1 component has the longest wavelength WL, therefore, the surface wave of the smallest frequency f1 reaches the seismic receiver 120 first. In other words, the time of arrival is automatically or manually identified by analyzing the waveform, by noting the specific moment when the surface wave first causes noticeable ground motion.

The step 308 further includes receiving, at the antenna 126 connected to the computing device 128, the time of arrival of the surface wave having the smallest frequency f1. The step 308 further includes dividing, by the computing device 128, the distance d between the seismic source 124 and the at least one seismic receiver 120 by the time of arrival to calculate the surface wave velocity v for the smallest frequency f1.

In another aspect, the method 300 includes determining the surface wave velocity v of the smallest frequency f1 by using the near surface velocity model 138 stored in the memory 134. The method 300 includes receiving, by the computing device 128, the distance of the at least one seismic receiver 120 from the seismic source 124. The method 300 also includes receiving from the at least one seismic receiver 120, by the antenna 126 operatively connected to the computing device 128, the amplitude and the time of arrival of each of the surface waves generated by the seismic source 124. Further, the method 300 includes comparing, by the computing device 128, each time of arrival of each of the surface waves to the near surface velocity model 138. In an aspect, the comparison may be performed to match the calculated time of arrival and the amplitude of each of the surface waves with the expected behavior of the surface waves in the near surface layers that are predicted by the near surface velocity model 138. In an aspect, the comparison may be performed between the time of arrival of each of the surface waves and the expected travel time based on the velocities from the near surface velocity model 138 for determining the surface wave velocity v for the smallest frequency f1.

In an aspect, the method 300 includes a step of constructing the near surface velocity model 138 based on the measurements obtained by at least one of the interferometry measurements, the sonic log measurements, the near surface seismic multi-channel analysis of surface waves and the refraction measurements.

At step 310, the method 300 includes calculating, by the computing device 128, the longest wavelength WL of the surface wave in the frequency band of interest based on equation (4).

At step 312, the method 300 includes installing, by the drilling system 130, the at least one borehole receiver 116 in the monitoring borehole 108 at the depth z equal to the longest wavelength WL. The at least one borehole receiver 116 is installed at the depth z in the range of 50 m to 200 m. In an aspect, the borehole receiver 116 may be installed to detect the seismic signals such as, the surface waves, the compressional waves and the like that may be generated by the microseismic events that occurred as the result of the multi-stage fracturing 104.

The method 300 also includes determining the noise amplitude $A_0$ of the surface waves. This step includes determining the sections of the electrical signals where the surface wave is not present and measuring the amplitude of these electrical signals. The measured signals represent the noise amplitude $A_0$ of the surface waves. The method 300 also includes determining the noise amplitude $A_1$ of the compressional waves. This step includes determining the sections of the electrical signals where the compressional wave is not present and measuring the amplitude of these signals. Such signals may provide the noise amplitude $A_1$ of each of the compressional waves. The method 300 also includes calculating the seismic noise level N(z) received by the borehole receiver 116 at the depth z. The seismic noise level N(z) is calculated by using equation (5).

In addition, the method 300 includes calculating the SNR (z) at the depth z of the borehole receiver 116 using equation (9) as defined above in FIG. 1C. In an aspect, equation (9) behaves differently based on the depth z, as the SNR(z) increases exponentially with the depth z for the seismic receivers located less than one wavelength WL beneath the surface of the ground and increases linearly for the borehole receivers 116 located at one wavelength WL or greater beneath the surface of the ground.

Figure 4:
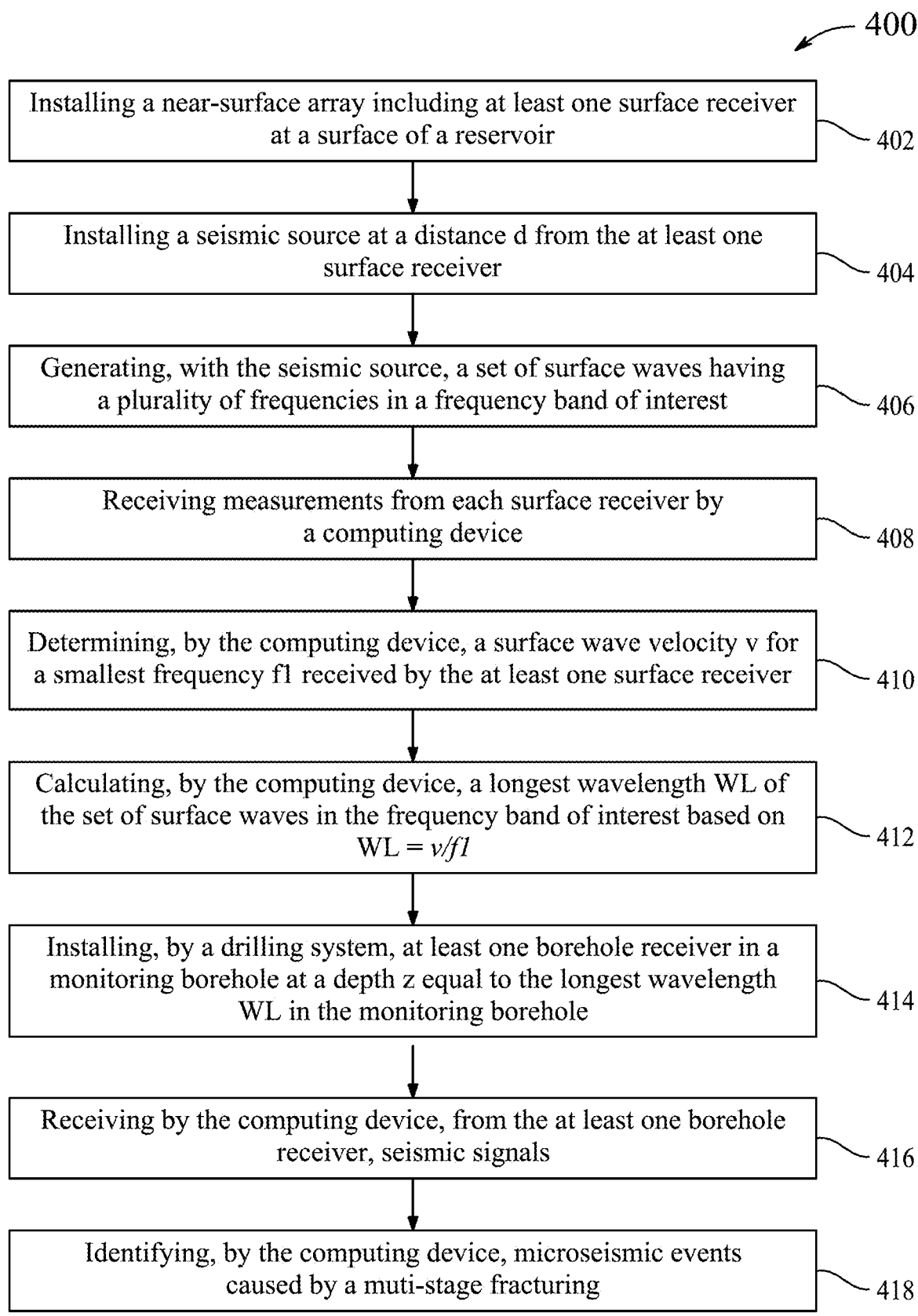
FIG. 4 illustrates a flowchart of a method of monitoring microseismic events in a reservoir undergoing a multi-stage fracturing, according to certain embodiments.

FIG. 4 illustrates a flowchart of a method 400 of monitoring the microseismic events in the reservoir 102 undergoing the multi-stage fracturing 104, according to certain embodiments. The method 400 includes a series of steps. These steps are only illustrative, and other alternatives may be considered where one or more steps are added, one or more steps are removed, or one or more steps are provided in a different sequence without departing from the scope of the present disclosure.

At step 402, the method 400 includes installing the near surface array 114 including the at least one seismic receiver 120 at the surface of the reservoir 102. The at least one seismic receiver 120 may be one of the geophones, the accelerometer, and the seismometer.

At step 404, the method 400 includes installing the seismic source 124 at the distance d from the at least one seismic receiver 120.

At step 406, the method 400 includes generating, with the seismic source 124, the set of surface waves having the frequencies in the frequency band of interest. In an example, the frequency band of interest is in a range of about 10 Hz to about 30 Hz. In an example, when the seismic source 124 is placed at or near the surface, the seismic source 124 generates the seismic energy that travels in the form of the surface waves along with the surface of the reservoir 102 to reach the seismic receiver 120.

At step 408, the method 400 includes receiving measurements from each seismic receiver 120 by the computing device 128. Here, the computing device 128 is operatively connected to the seismic receiver 120. The measurements may be the electrical signals that may represent the characteristics of the surface waves. The characteristics of the surface waves may be, but are not limited to, the amplitude, the frequency, the phase, the time of arrival of the smallest frequency f1, and the like.

At step 410, the method 400 includes determining the surface wave velocity v for the smallest frequency f1 received by the at least one seismic receiver 120. In an aspect, step 410 includes dividing the distance between the seismic source 124 and the at least one seismic receiver 120 by the time of arrival of the smallest frequency f1. In another aspect, the step 410 includes determining the surface wave velocity v of the smallest frequency f1 by using the near surface velocity model 138 stored in the memory 134 of the computing device 128.

At step 412, the method 400 includes calculating the longest wavelength WL of the surface wave in the frequency band of interest based on the surface wave velocity v and the smallest frequency f1 using equation (4).

At step 414, the method 400 includes installing, by the drilling system 130, the at least one borehole receiver 116 in the monitoring borehole 108 at the depth z equal to the longest wavelength WL in the monitoring borehole 108.

At step 416, the method 400 includes receiving by the computing device 128, from the at least one borehole receiver 116, the seismic signals. The step 416 includes receiving the seismic signals from the least one borehole receiver 116 by the antenna 126. The seismic signals such as, the surface waves, the compressional waves and the like may be generated by the microseismic events occurred as the result of the multi-stage fracturing 104.

At step 418, the method 400 includes identifying, by the computing device 128, the microseismic events caused by the multi-stage fracturing 104. The step 418 includes processing the seismic signals to identify and characterize the microseismic events caused by the multi-stage fracturing 104. In an aspect, the computing device 128 may use techniques such as signal processing, waveform analysis and the like for identifying the microseismic events from the seismic signals.

The first embodiment is illustrated with respect to FIG. 1A-FIG. 3. The first embodiment describes a method 300 for installing a borehole receiver 116 in a monitoring borehole 108. The method 300 includes generating, with a seismic source 124, a set of surface waves having a plurality of frequencies in a frequency band of interest. The method 300 includes receiving, by at least one seismic receiver 120 placed at a distance d from the seismic source 124, the set of surface waves. The method 300 includes determining, with a computing device 128 operatively connected to each seismic receiver 120, a smallest frequency f1 of the plurality of frequencies. The computing device 128 includes an electrical circuitry 132, a memory 134 storing program instructions, and at least one processor 136 configured to execute the program instructions. The method 300 includes determining, by the computing device 128, a surface wave velocity v for the smallest frequency f1. The method 300 includes calculating, by the computing device 128, a longest wavelength WL of the surface wave in the frequency band of interest based on $$WL = \frac{v}{f1}.$$

The method 300 includes installing, by a drilling system 130, at least one borehole receiver 116 in the monitoring borehole 108 at a depth z equal to the longest wavelength WL.

In an aspect, determining the surface wave velocity v for the smallest frequency f1 includes recording a time of arrival of a surface wave having the smallest frequency f1 at the at least one seismic receiver 120, receiving, at an antenna 126 connected to the computing device 128, the time of arrival of the surface wave having the smallest frequency f1 and dividing, by the computing device 128, the distance d between the seismic source 124 and the at least one seismic receiver 120 by the time of arrival.

In an aspect, the method 300 includes storing, in the memory 134 of the computing device 128, a near surface velocity model 138. The method 300 includes receiving, by the computing device 128, a distance of the at least one seismic receiver 120 from the seismic source 124. The method 300 includes receiving from the at least one seismic receiver 120, by an antenna 126 operatively connected to the computing device 128, an amplitude and a time of arrival of each of the set of surface waves generated by the seismic source 124. The method 300 includes comparing, by the computing device 128, each time of arrival of each of the set of surface waves to the near surface velocity model 138. The method 300 includes determining, from the near surface velocity model 138, the surface wave velocity v for the smallest frequency f1.

In an aspect, the method 300 includes constructing, by the at least one processor 136, the near surface velocity model 138 based on measurements obtained by at least one of interferometry measurements, sonic log measurements, near surface seismic multi-channel analysis of surface waves and refraction measurements.

In an aspect, the method 300 includes determining, by the computing device 128, a noise amplitude $A_0$ of the set of surface waves. The method 300 includes receiving, by the at least one seismic receiver 120 placed at the distance d from the seismic source 124, a set of compressional waves. The method 300 includes determining, by the computing device 128, a noise amplitude $A_1$ of each compressional wave. The method 300 includes calculating by the computing device 128, a seismic noise level N(z) based on:

$$N(z) = A_0 e^{-\alpha z f} + \frac{A_1}{z},$$

where $\alpha$ is a coefficient which is a function of the near surface velocity model 138 and z is the depth of the borehole receiver 116 measured from a surface of the ground.

In an aspect, the method 300 includes calculating, by the computing device 128, a signal-to-noise ratio SNR(z) at the depth z of the borehole receiver 116 based on:

$$SNR(z) = \frac{B_0}{\left(A_0 e^{-\alpha z f} + \frac{A_1}{z}\right)},$$

where $B_0$ is constant representing an approximation of an amplitude of the compressional waves received by the borehole receiver 116.

In an aspect, the signal-to-noise ratio SNR(z) increases exponentially with depth z for seismic receivers located less than one wavelength WL beneath the surface of the ground and increases linearly for borehole receivers 116 located at one wavelength WL or greater beneath the surface of the ground.

In an aspect, installing, by the drilling system 130, the borehole receiver 116 at the depth z in a range of 50 m to 200 m.

The second embodiment is illustrated with respect to FIG. 1A-FIG. 1C. The second embodiment describes the system 122 for determining a depth z at which to install a borehole receiver 116 in a monitoring borehole 108. The system 122 includes at least one seismic source 124 configured to generate, within a geologic reservoir 102, a set of surface waves having a plurality of frequencies in a frequency band of interest. The system 122 includes at least one seismic receiver 120 placed at a distance d from the seismic source 124, wherein the seismic receiver 120 is configured to receive the set of surface waves. The system 122 includes an antenna 126. The system 122 includes a computing device 128 operatively connected by the antenna 126 to each seismic receiver 120. The computing device 128 includes an electrical circuitry 132, a memory 134 storing program instructions and at least one processor 136 configured to execute the program instructions to determine a smallest frequency f1 of the plurality of frequencies. The at least one processor 136 is further configured to execute the program instructions to determine a surface wave velocity v for the smallest frequency f1. The at least one processor 136 is further configured to execute the program instructions to calculate a longest wavelength WL of the surface wave in the frequency band of interest based on $$WL = \frac{v}{f1}.$$

The system 122 includes a drilling system 130 configured to install at least one borehole receiver 116 in the monitoring borehole 108 at a depth z equal to the longest wavelength WL.

In an aspect, the at least one seismic receiver 120 is configured to record a time of arrival of the smallest frequency f1 and the at least one processor 136 is configured to execute the program instructions to divide a distance between the seismic source 124 and the at least one seismic receiver 120 by the time of arrival to determine the surface wave velocity v for the smallest frequency f1.

In an aspect, the system 122 includes a near surface velocity model 138 stored in the memory 134 of the computing device 128. The computing device 128 is configured to receive a distance of the at least one seismic receiver 120 from the seismic source 124. The computing device 128 is further configured to receive an amplitude and a time of arrival of each of the set of surface waves generated by the seismic source 124. The computing device 128 is further configured to compare each time of arrival of each of the set of surface waves to the near surface velocity model 138. The computing device 128 is further configured to determine, from the near surface velocity model 138, the surface wave velocity v for the smallest frequency f1.

In an aspect, the at least one processor 136 is configured to construct the near surface velocity model 138 based on measurements obtained by at least one of interferometry measurements, sonic log measurements, near surface seismic multi-channel analysis of surface waves and refraction measurements.

In an aspect, the at least one seismic receiver 120 placed near at a distance d from the seismic source 124 is configured to receive a set of compressional waves.

In an aspect, the computing device 128 is configured to determine a noise amplitude $A_0$ of the set of surface waves. The computing device 128 is further configured to: determine a noise amplitude $A_1$ of each compressional wave. The computing device 128 is further configured to calculate a seismic noise level N(z) received by the borehole receiver 116 at the depth z based on:

$$N(z) = A_0 e^{-\alpha z f} + \frac{A_1}{z}$$

where α is a coefficient which is a function of the near surface velocity model 138.

In an aspect, the computing device 128 is configured to calculate a signal-to-noise ratio S SNR(z) at the depth z of the borehole receiver 116 based on:

$$SNR(z) = \frac{B_0}{\left(A_0 e^{-\alpha z f} + \frac{A_1}{z}\right)}$$

where $B_0$ is constant representing an approximation of an amplitude of the compressional waves received by the borehole receiver 116.

In an aspect, the depth z is in a range of 50 m to 200 m.

In an aspect, the seismic receiver 120 is one of a geophone configured to record components of particle ground velocity, an accelerometer configured to record particle ground acceleration, and a seismometer configured to record displacement and strain.

In an aspect, the at least one seismic receiver 120 is an accelerometer configured to record particle ground acceleration.

In an aspect, the at least one borehole receiver 116 is a short period geophone.

In an aspect, the at least one borehole receiver 116 is a three-component seismic receiver. The third embodiment is illustrated with respect to FIG. 1A-FIG. 4. The third embodiment describes a method 400 for monitoring the microseismic events in a geologic reservoir 102 undergoing multi-stage fracturing 104. The method 400 includes installing a near surface array 114 including at least one seismic receiver 120 at a surface of the geologic reservoir 102. The method 400 further includes installing a seismic source 124 at a distance d from the at least one seismic receiver 120. The method 400 also includes generating, with the seismic source 124, a set of surface waves having a plurality of frequencies in a frequency band of interest. The frequency band of interest is in a range of about 10 Hz to about 30 Hz. The method 400 further includes operatively connecting a computing device 128 to receive measurements from each seismic receiver 120. The computing device 128 includes an electrical circuitry 132, a memory 134 storing program instructions and at least one processor 136 configured to execute the program instructions for determining a surface wave velocity v for a smallest frequency f1 received by the at least one seismic receiver 120. The at least one processor 136 is further configured to execute the program instructions for calculating a longest wavelength WL of the surface wave in the frequency band of interest based on $$WL = \frac{v}{f1}.$$

The method 400 further includes installing, for example using a drilling system 130, at least one borehole receiver 116 in a monitoring borehole 108 at a depth z equal to the longest wavelength WL in the monitoring borehole 108. The method 400 further includes receiving by the computing device 128, from the at least one borehole receiver 116, seismic signals. The method 400 further includes identifying, by the computing device 128, the microseismic events caused by the multi-stage fracturing 104.

Figure 5:
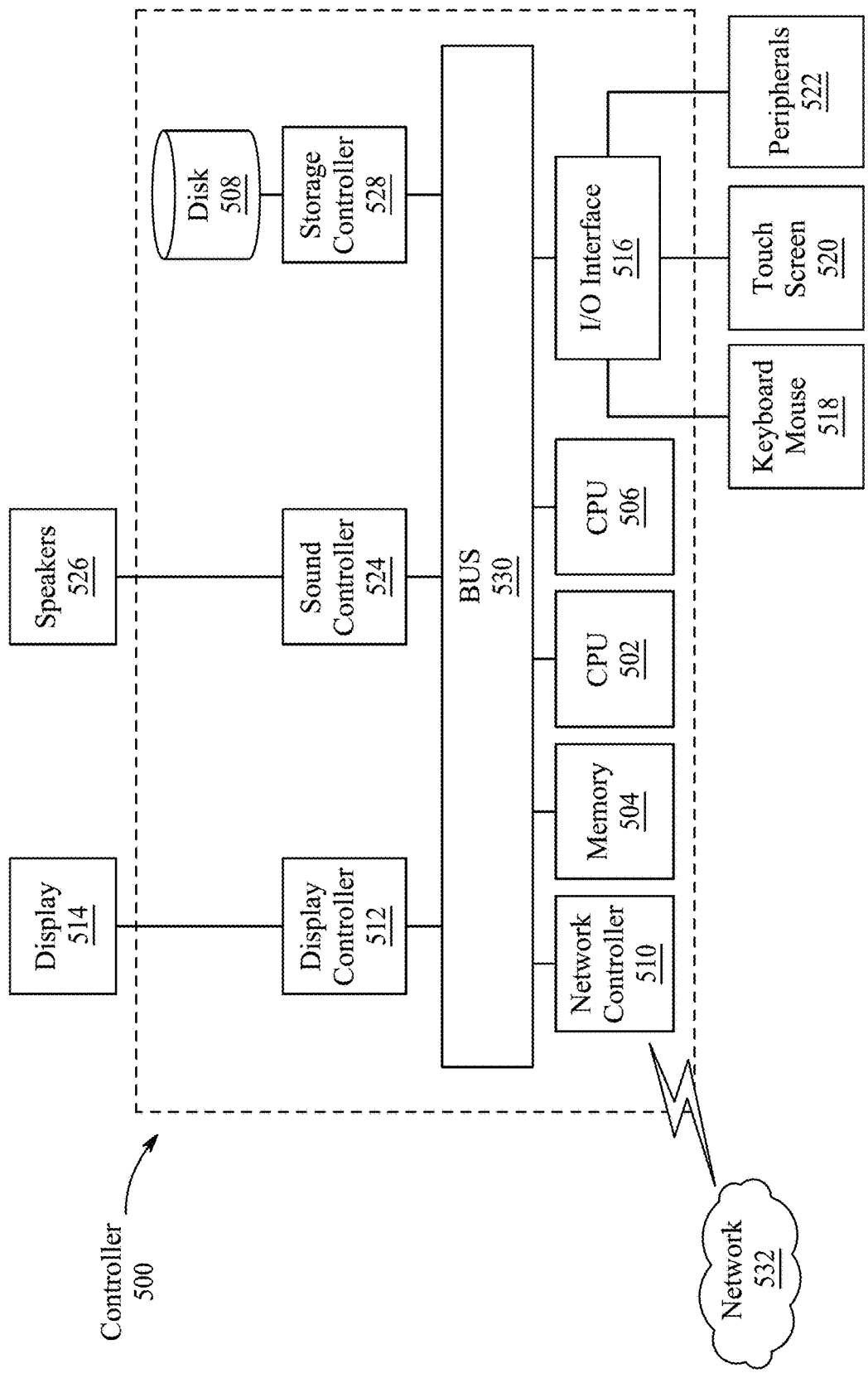
FIG. 5 is an illustration of a non-limiting example of details of computing hardware used in the computing system, according to certain embodiments.

Next, further details of the hardware description of the computing environment according to exemplary embodiments are described with reference to FIG. 5. In FIG. 5, a controller 500 is described as representative of the computing device 128 of the system 122 of FIG. 1C in which the controller 500 includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN subnetworks. The network 560 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
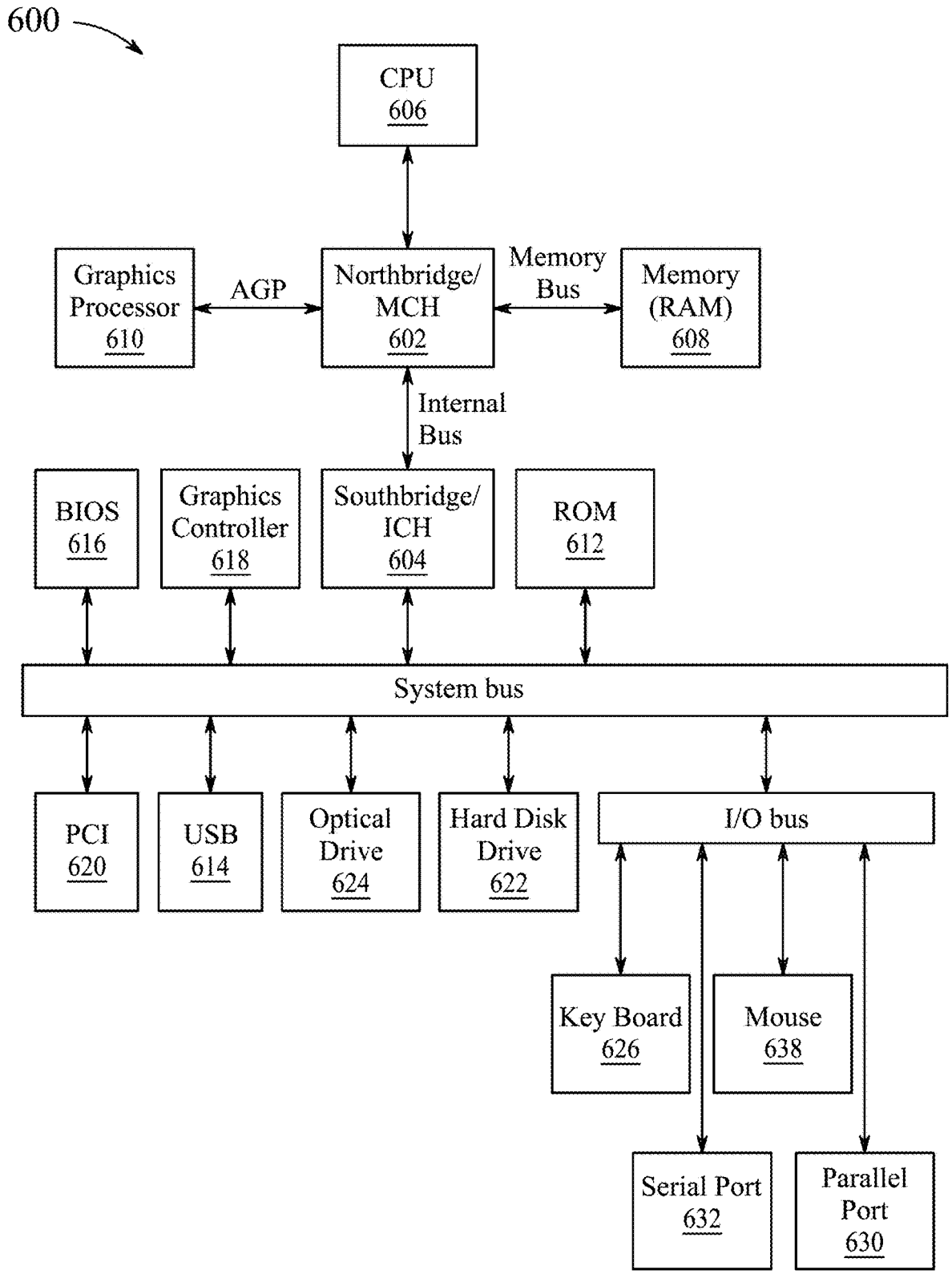
FIG. 6 is an exemplary schematic diagram of a data processing system used within the computing system, according to certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
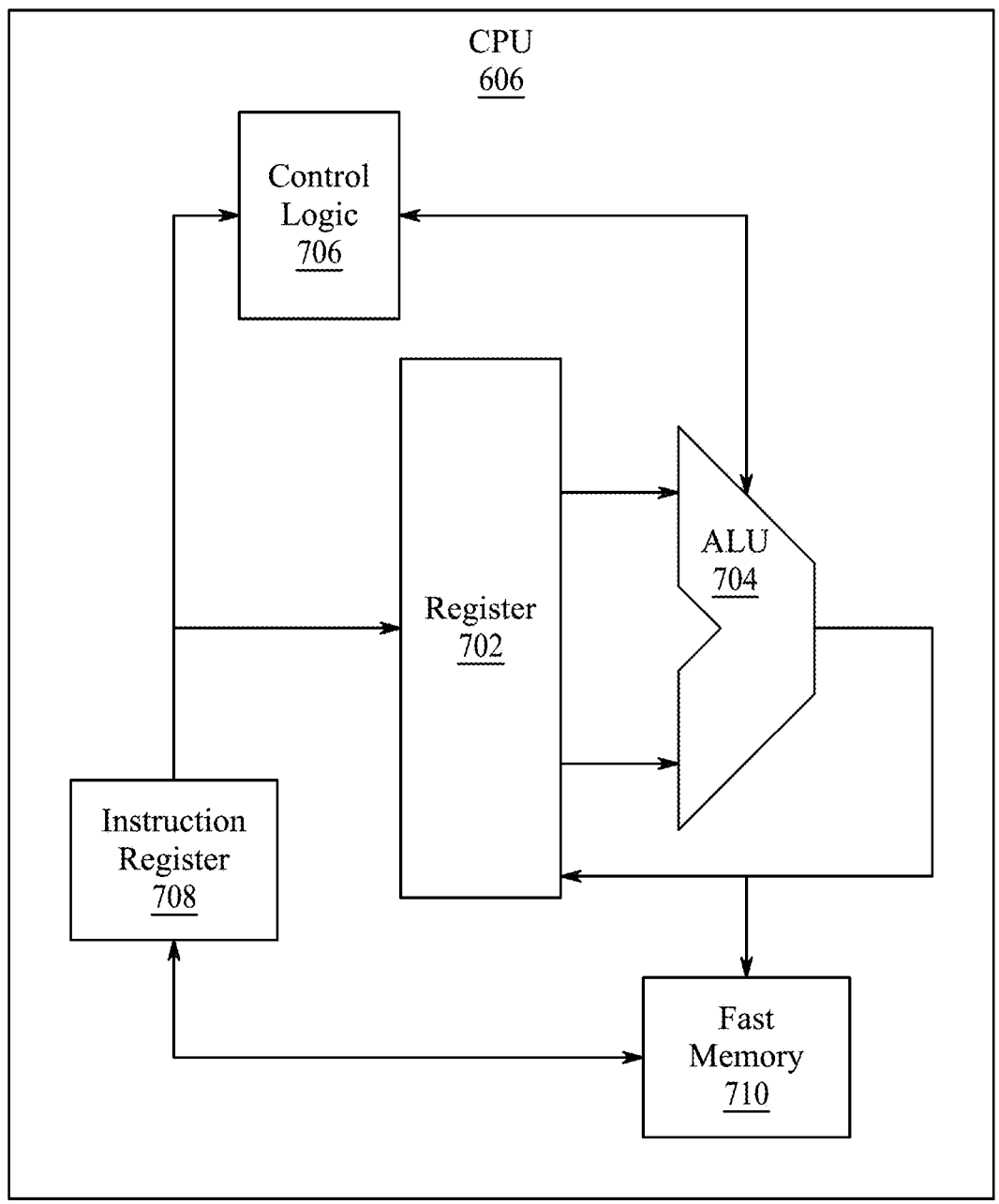
FIG. 7 is an exemplary schematic diagram of a processor used with the computing system, according to certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 8:
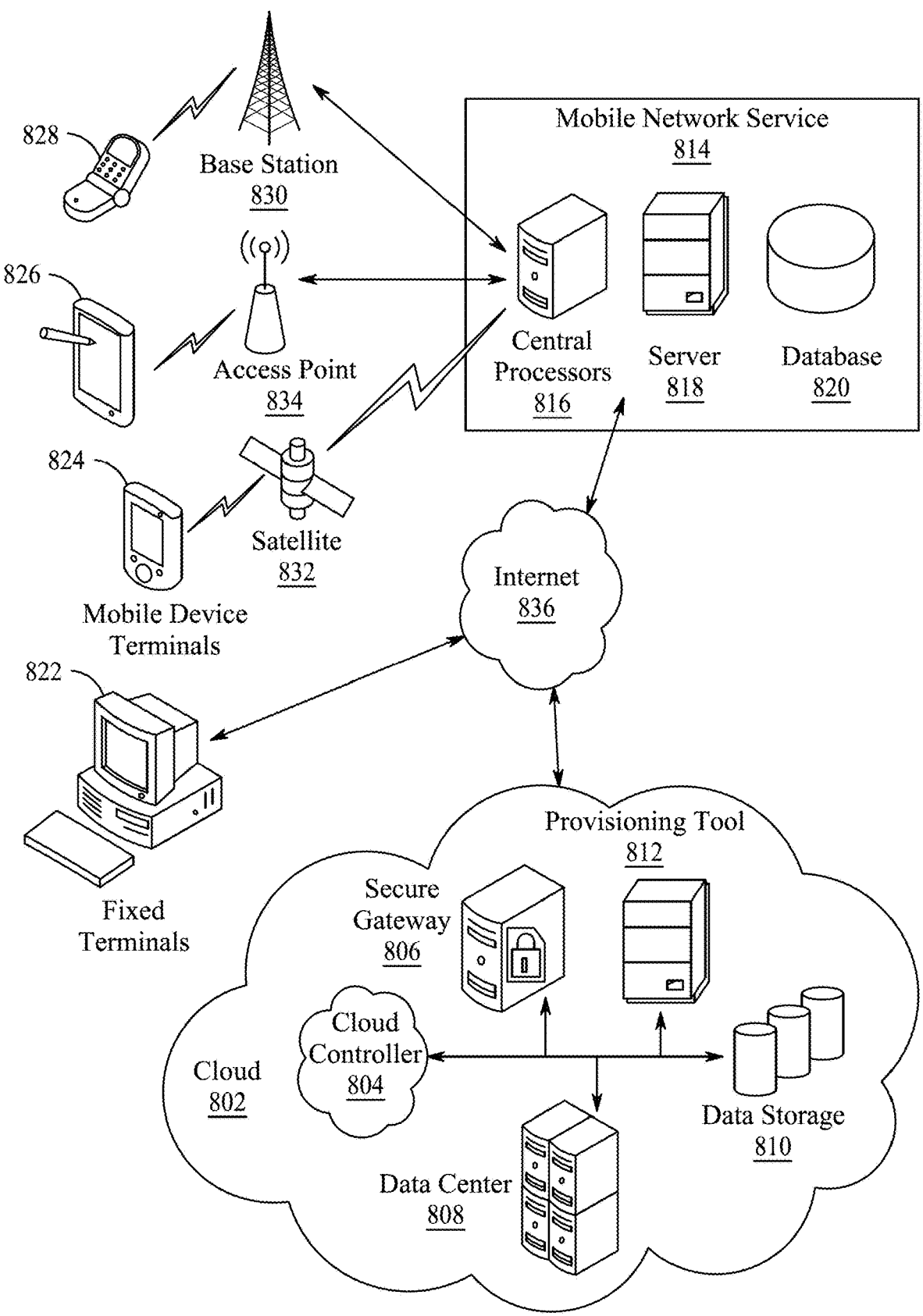
FIG. 8 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 830 including a cloud controller 836, a secure gateway 832, a data center 834, data storage 838 and a provisioning tool 840, and mobile network services 820 including central processors 822, a server 824 and a database 826, which may share processing, as shown by FIG. 8, in addition to various human interface and communication devices (e.g., display monitors 816, smart phones 810, tablets 812, personal digital assistants (PDAs) 814). The network may be a private network, such as a LAN, satellite 852 or WAN 854, or be a public network, may such as the Internet 836. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for installing a borehole receiver in a monitoring borehole, comprising:
generating, with a seismic source, a set of surface waves having a plurality of frequencies in a frequency band of interest;
receiving, by at least one seismic receiver placed at a distance d from the seismic source, the set of surface waves;
determining, with a computing device operatively connected to each seismic receiver, wherein the computing device includes an electrical circuitry, a memory storing program instructions and at least one processor configured to execute the program instructions, a smallest frequency f1 of the plurality of frequencies;
determining, by the computing device, a surface wave velocity v for the smallest frequency f1;
calculating, by the computing device, a longest wavelength WL of the surface wave in the frequency band of interest based on $$WL = \frac{v}{f1};$$

and
installing at least one borehole receiver in the monitoring borehole at a depth z equal to the longest wavelength WL.

2. The method of claim 1, wherein determining the surface wave velocity v for the smallest frequency f1 includes recording a time of arrival of a surface wave having the smallest frequency f1 at the at least one seismic receiver, receiving, at an antenna connected to the computing device, the time of arrival of the surface wave having the smallest frequency f1 and dividing, by the computing device, the distance d between the seismic source and the at least one seismic receiver by the time of arrival.

3. The method of claim 1, further comprising:
storing, in the memory of the computing device, a near surface velocity model;
receiving, by the computing device, a distance of the at least one seismic receiver from the seismic source;
receiving from the at least one seismic receiver, by an antenna operatively connected to the computing device, an amplitude and a time of arrival of each of the set of surface waves generated by the seismic source;
comparing, by the computing device, each time of arrival of each of the set of surface waves to the near surface velocity model; and
determining, from the near surface velocity model, the surface wave velocity v for the smallest frequency f1.

4. The method of claim 3, further comprising:
constructing, by the at least one processor, the near surface velocity model based on measurements obtained by at least one of interferometry measurements, sonic log measurements, near surface seismic multi-channel analysis of surface waves and refraction measurements.

5. The method of claim 3, further comprising:
determining, by the computing device, a noise amplitude $A_0$ of the set of surface waves;
receiving, by the at least one seismic receiver placed at a distance d from the seismic source, a set of compressional waves;
determining, by the computing device, a noise amplitude $A_1$ of each compressional wave;

calculating, by the computing device, a seismic noise level N(z) based on:

$$N(z) = A_0 e^{-\alpha z f} + \frac{A_1}{z}$$

where α is a coefficient which is a function of the near surface velocity model and z is the depth of the borehole receiver measured from a surface of the ground.

6. The method of claim 5, further comprising:
calculating, by the computing device, a signal to noise ratio SNR(z) at the depth z of the borehole receiver based on:

$$SNR(z) = \frac{B_0}{\left(A_0 e^{-\alpha z f} + \frac{A_1}{z}\right)}$$

where $B_0$ is constant representing an approximation of an amplitude of the compressional waves received by the borehole receiver.

7. The method of claim 5, wherein a signal to noise ratio SNR(z) increases exponentially with a depth z for seismic receivers located less than one wavelength WL beneath the surface of the ground and increases linearly for borehole receivers located at one wavelength WL or greater beneath the surface of the ground.

8. The method of claim 1, installing, by a drilling system, the borehole receiver at the depth z in a range of 50 m to 200 m.

9. A system for determining a depth z at which to install a borehole receiver in a monitoring borehole, comprising:
at least one seismic source configured to generate, within a geologic reservoir, a set of surface waves having a plurality of frequencies in a frequency band of interest;
at least one seismic receiver placed at a distance d from the seismic source, wherein the seismic receiver is configured to receive the set of surface waves;
an antenna;
a computing device operatively connected by the antenna to each seismic receiver, wherein the computing device includes an electrical circuitry, a memory storing program instructions and at least one processor configured to execute the program instructions to:
determine a smallest frequency f1 of the plurality of frequencies;
determine a surface wave velocity v for the smallest frequency f1;
calculate a longest wavelength WL of the surface wave in the frequency band of interest based on $$WL = \frac{v}{f1};$$

and
a drilling system configured to install at least one borehole receiver in the monitoring borehole at the depth z equal to the longest wavelength WL.

10. The system of claim 9, wherein:
the at least one seismic receiver is configured to record a time of arrival of the smallest frequency f1; and
the at least one processor is configured to execute the program instructions to divide a distance between the seismic source and the at least one seismic receiver by the time of arrival to determine the surface wave velocity v for the smallest frequency f1.

11. The system of claim 9, further comprising:
a near surface velocity model stored in the memory of the computing device;
wherein the computing device is configured to:
receive a distance of the at least one seismic receiver from the seismic source,
receive an amplitude and a time of arrival of each of the set of surface waves generated by the seismic source,
compare each time of arrival of each of the set of surface waves to the near surface velocity model, and
determine, from the near surface velocity model, the surface wave velocity v for the smallest frequency f1.

12. The system of claim 11, wherein the at least one processor is configured to construct the near surface velocity model based on measurements obtained by at least one of interferometry measurements, sonic log measurements, near surface seismic multi-channel analysis of surface waves and refraction measurements.

13. The system of claim 11, wherein:
the at least one seismic receiver placed near at a distance d from the seismic source is configured to receive a set of compressional waves;
the computing device is further configured to:
determine a noise amplitude $A_0$ of the set of surface waves;
determine a noise amplitude $A_1$ of each compressional wave;
calculate a seismic noise level N(z) received by the borehole receiver at the depth z based on:

$$N(z) = A_0 e^{-\alpha z f} + \frac{A_1}{z}$$

where α is a coefficient which is a function of the near surface velocity model.

14. The system of claim 13, the computing device is further configured to:
calculate a signal to noise ratio SNR(z) at the depth z of the borehole receiver based on:

$$SNR(z) = \frac{B_0}{\left(A_0 e^{-\alpha z f} + \frac{A_1}{z}\right)}$$

where $B_0$ is constant representing an approximation of an amplitude of the compressional waves received by the borehole receiver.

15. The system of claim 13, wherein the depth z is in a range of 50 m to 200 m.

16. The system of claim 9, wherein the seismic receiver is one of a geophone configured to record components of particle ground velocity, an accelerometer configured to record particle ground acceleration, and a seismometer configured to record displacement and strain.

17. The system of claim 9, wherein the at least one seismic receiver is an accelerometer configured to record particle ground acceleration.

18. The system of claim 9, wherein the at least one borehole receiver is a short period geophone.

19. The system of claim 9, wherein the at least one borehole receiver is a three component seismic receiver.

20. A method of monitoring microseismic events in a geologic reservoir undergoing multi-stage fracturing, comprising:
- installing a near surface array including at least one seismic receiver at a surface of the geologic reservoir;
- installing a seismic source at a distance d from the at least one seismic receiver;
- generating, with the seismic source, a set of surface waves having a plurality of frequencies in a frequency band of interest, wherein the frequency band of interest is in a range of about 10 Hz to about 30 Hz;
- operatively connecting a computing device to receive measurements from each seismic receiver, wherein the computing device includes an electrical circuitry, a memory storing program instructions and at least one processor configured to execute the program instructions for:
  - determining a surface wave velocity v for a smallest frequency f1 received by the at least one seismic receiver;
  - calculating a longest wavelength WL of the surface wave in the frequency band of interest based on $$WL = \frac{v}{f1};$$

- installing, by a drilling system, at least one borehole receiver in a monitoring borehole at a depth z equal to the longest wavelength WL in the monitoring borehole;
  - receiving by the computing device, from the at least one borehole receiver, seismic signals; and
  - identifying, by the computing device, the microseismic events caused by the multi-stage fracturing.

* * * * *